US008739407B2

(12) United States Patent
Jimenez et al.

(10) Patent No.: US 8,739,407 B2
(45) Date of Patent: Jun. 3, 2014

(54) METHOD OF ASSEMBLING AN OPTICAL SENSOR ASSEMBLY FOR A CARRIAGE PRINTER

(75) Inventors: Juan Manuel Jimenez, Escondido, CA (US); Richard A. Murray, San Diego, CA (US)

(73) Assignee: Eastman Kodak Company, Rochester, NY (US)

( * ) Notice: Subject to any disclaimer, the term of this patent is extended or adjusted under 35 U.S.C. 154(b) by 101 days.

(21) Appl. No.: 13/315,866

(22) Filed: Dec. 9, 2011

(65) Prior Publication Data

US 2013/0145617 A1    Jun. 13, 2013

(51) Int. Cl.
*B21D 53/76* (2006.01)
*B23P 17/00* (2006.01)

(52) U.S. Cl.
USPC ............. 29/890.1; 29/592.1; 29/595; 347/68; 347/70; 347/71

(58) Field of Classification Search
USPC ............. 29/25.35, 595, 890.1; 347/68, 70, 71
See application file for complete search history.

(56) References Cited

U.S. PATENT DOCUMENTS

| | | | | |
|---|---|---|---|---|
| 5,170,047 A | | 12/1992 | Beauchamp et al. | |
| 5,255,009 A | * | 10/1993 | Bauer et al. | 346/25 |
| 5,276,467 A | * | 1/1994 | Meyer et al. | 347/19 |
| 5,350,929 A | * | 9/1994 | Meyer et al. | 250/573 |
| 5,376,958 A | * | 12/1994 | Richtsmeier et al. | 347/104 |
| 5,742,304 A | * | 4/1998 | Richtsmeier et al. | 347/40 |
| 5,905,512 A | | 5/1999 | Beauchamp | |
| 5,975,674 A | | 11/1999 | Beauchamp et al. | |
| 6,036,298 A | | 3/2000 | Walker | |
| 6,172,690 B1 | | 1/2001 | Angulo et al. | |
| 6,322,192 B1 | | 11/2001 | Walker | |
| 6,400,099 B1 | | 6/2002 | Walker | |
| 6,623,096 B1 | | 9/2003 | Castano | |
| 6,764,158 B2 | | 7/2004 | Arquilevich et al. | |
| 6,905,187 B2 | | 6/2005 | Arquilevich et al. | |
| 7,350,902 B2 | | 4/2008 | Dietl et al. | |
| 7,800,089 B2 | | 9/2010 | Burke et al. | |

* cited by examiner

*Primary Examiner* — Paul D Kim
(74) *Attorney, Agent, or Firm* — Peyton C. Watkins

(57) ABSTRACT

A method of assembling an optical sensor assembly for a carriage of a carriage printer, the method includes providing a flexible circuit subassembly including a photosensor and a light source; providing a mounting member including a first cavity and a second cavity having an orientation that is different than an orientation of the first cavity; mounting the flexible circuit subassembly on the mounting member such that the photosensor is disposed in the first cavity and the light source is disposed in the second cavity; and affixing the mounting member to an outer housing, wherein a connector end of the flexible circuit subassembly extends outwardly from the mounting member and the outer housing.

9 Claims, 21 Drawing Sheets

METHOD OF ASSEMBLING AN OPTICAL SENSOR ASSEMBLY FOR A CARRIAGE PRINTER

CROSS REFERENCE TO RELATED APPLICATION

Reference is made to commonly assigned, co-pending U.S. patent application Ser. No. 13/315,838, concurrently filed herewith, entitled "Carriage Printer With Optical Sensor Assembly" by Juan M. Jimenez et al, the disclosure of which is herein incorporated by reference.

FIELD OF THE INVENTION

This invention relates generally to the field of carriage printers, and in particular to a carriage-mounted optical sensor assembly configured to obtain information regarding a printing side of the recording medium.

BACKGROUND OF THE INVENTION

A common type of printer architecture is a carriage printer, where a printhead array of marking elements is somewhat smaller than an extent of a region of interest for printing on a recording medium and a printhead is mounted on a carriage. In a carriage printer, the recording medium is advanced a given distance along a media advance direction and then stopped. While the recording medium is stopped, the printhead is moved by the carriage in a carriage scan direction that is substantially perpendicular to the media advance direction as marks are controllably made by marking elements. After the printhead has printed a swath of an image while traversing the recording medium, the recording medium is advanced, the carriage direction of motion is reversed, and the image is formed swath by swath.

One example of a carriage printer is an inkjet printer. An inkjet printing system typically includes one or more printheads and their corresponding ink supplies. Each printhead includes an ink inlet that is connected to its ink supply and an array of drop ejectors that function as marking elements, each ejector consisting of an ink pressurization chamber, an ejecting actuator and a nozzle through which droplets of ink are ejected. The ejecting actuator can be one of various types, including a heater that vaporizes some of the ink in a pressurization chamber in order to propel a droplet out of an orifice, or a piezoelectric device which changes the wall geometry of the chamber in order to generate a pressure wave that ejects a droplet. The droplets are typically directed toward paper or other recording medium in order to produce an image according to image data that is converted into electronic firing pulses for the drop ejectors as the printhead is moved relative to the recording medium.

In order to produce high quality images, it is helpful to provide information to the printer controller electronics regarding the printing side of the recording medium and the characteristics of the marks printed on the recording medium by the printhead. Information about the recording medium itself can include whether it is a glossy or matte-finish paper. Information about the marks printed on the recording medium can include relative alignment between marks of different colors, angular misorientation of the printhead relative to the direction of relative motion of the recording medium, or relative alignment of marks between left to right and right to left passes in a carriage printer, or missing marks corresponding to defective portions of the printhead, such as bad nozzles in an inkjet printhead. Using the information from the optical sensor, the printer controller is designed to control the printing process to optimize printing quality by using appropriate print modes for the detected media type, by correcting for various types of misalignments and by compensating for defective portions of the printhead.

It is known in the prior art to attach an optical sensor assembly to the printhead carriage of a carriage printer. See for example U.S. Pat. Nos. 5,170,047; 5,905,512; 5,975,674; 6,036,298; 6,172,690; 6,322,192; 6,400,099; 6,623,096; 6,764,158; 6,905,187 and 7,800,089. Such an optical sensor assembly can be called a carriage sensor. In the same way that the printhead can mark on all regions of the paper by the back and forth motion of the carriage and by the advancing of the recording medium between passes of the carriage, it is desirable for the carriage sensor to be able to provide optical measurements, such as optical reflectance, for all regions of the paper. A carriage sensor assembly typically includes one or more photosensors and one or more light sources, such as LED's, mounted such that the emitted light is reflected off the printing side of the recording medium, and the reflected light is received in the one or more photosensors. LEDs and photosensors can be oriented relative to each other such that the photosensor receives specular reflections of light emitted from an LED (i.e. light reflected from the recording medium at the same angle as the incident angle relative to the normal to the nominal plane of the recording medium) or diffuse reflections of light emitted from an LED (i.e. light reflected from the recording medium at a different angle than the angle of incidence). A carriage sensor such as that described in U.S. Pat. No. 7,800,089, which is incorporated by reference herein in its entirety, works well for detecting surface roughness of the recording medium, side edges of the recording medium, and alignment marks and test patterns printed on the recording medium. However, a more compact carriage sensor is needed for printers having a small footprint. It has been found that for some carriage printers having a reduced width that a carriage sensor such as the one described in U.S. Pat. No. 7,800,089 cannot detect both side edges of the widest compatible recording medium without interfering with other portions of the printer. In addition, a more economical carriage sensor is needed, especially for low cost printers. It is also desirable to have a carriage sensor assembly that is more efficient than carriage sensors of the prior art.

SUMMARY OF THE INVENTION

The present invention is directed to overcoming one or more of the problems set forth above. Briefly summarized, according to one aspect of the invention, the invention resides in a method of assembling an optical sensor assembly for a carriage of a carriage printer, the method includes providing a flexible circuit subassembly including a photosensor and a light source; providing a mounting member including a first cavity and a second cavity having an orientation that is different than an orientation of the first cavity; mounting the flexible circuit subassembly on the mounting member such that the photosensor is disposed in the first cavity and the light source is disposed in the second cavity; and affixing the mounting member to an outer housing, wherein a connector end of the flexible circuit subassembly extends outwardly from the mounting member and the outer housing.

DETAILED DESCRIPTION OF THE INVENTION

Figure 1:
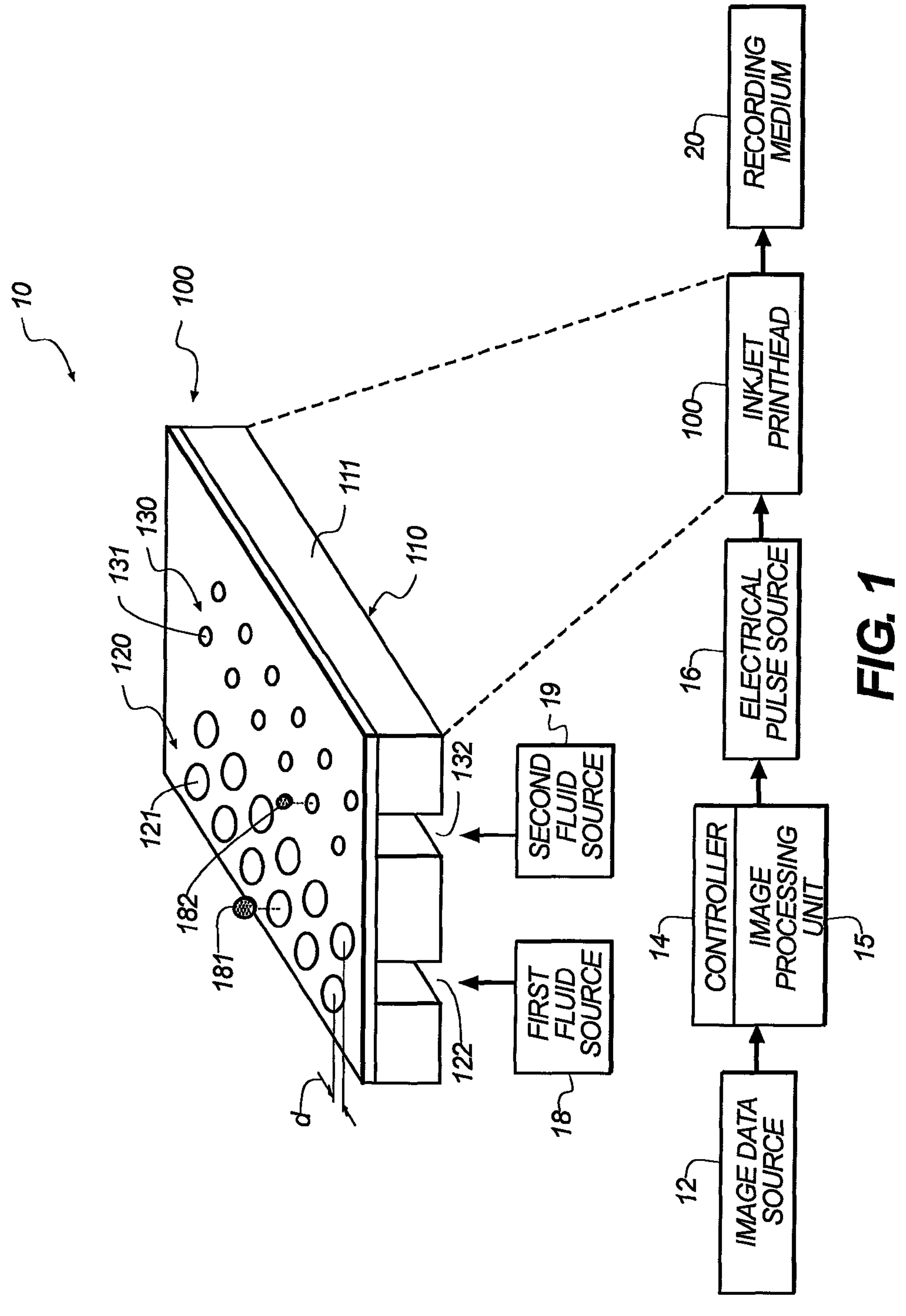
FIG. 1 is a schematic representation of an inkjet printer system.

Referring to FIG. 1, a schematic representation of an inkjet printer system 10 is shown, for its usefulness with the present invention and is fully described in U.S. Pat. No. 7,350,902, and is incorporated by reference herein in its entirety. Inkjet printer system 10 includes an image data source 12, which provides data signals that are interpreted by a controller 14 as being commands to eject drops. Controller 14 includes an image processing unit 15 for rendering images for printing, and outputs signals to an electrical pulse source 16 of electrical energy pulses that are inputted to an inkjet printhead 100, which includes at least one inkjet printhead die 110.

In the example shown in FIG. 1, there are two nozzle arrays 120, 130 disposed at a surface of inkjet printhead die 110. Nozzles 121 in the first nozzle array 120 have a larger opening area than nozzles 131 in the second nozzle array 130. In this example, each of the two nozzle arrays 120, 130 has two staggered rows of nozzles, each row having a nozzle density of 600 per inch. The effective nozzle density then in each array is 1200 per inch (i.e. $d=1/1200$ inch in FIG. 1). If pixels on a recording medium 20 were sequentially numbered along a paper advance direction, the nozzles from one row of an array would print the odd numbered pixels, while the nozzles from the other row of the array would print the even numbered pixels.

In fluid communication with each nozzle array 120, 130 is a corresponding ink delivery pathway 122, 132. Ink delivery pathway 122 is in fluid communication with the first nozzle array 120, and ink delivery pathway 132 is in fluid communication with the second nozzle array 130. Portions of ink delivery pathways 122 and 132 are shown in FIG. 1 as openings through a printhead die substrate 111. One or more inkjet printhead die 110 will be included in inkjet printhead 100, but for greater clarity only one inkjet printhead die 110 is shown in FIG. 1. The printhead die 110 are arranged on a support member as discussed below relative to FIG. 2. In FIG. 1, a first ink source 18 supplies ink to first nozzle array 120 via ink delivery pathway 122, and a second ink source 19 supplies ink to second nozzle array 130 via ink delivery pathway 132. Although distinct ink sources 18 and 19 are shown, in some applications it can be beneficial to have a single ink source supplying ink to both the first nozzle array 120 and the second nozzle array 130 via ink delivery pathways 122 and 132 respectively. Also, in some embodiments, fewer than two or more than two nozzle arrays 120, 130 can be included on printhead die 110. In some embodiments, all nozzles on inkjet printhead die 110 can be the same size, rather than having multiple sized nozzles on inkjet printhead die 110.

Not shown in FIG. 1, are the drop forming mechanisms associated with the nozzles. Drop forming mechanisms can be of a variety of types, some of which include a heating element to vaporize a portion of ink and thereby cause ejection of a droplet, or a piezoelectric transducer to constrict the volume of a fluid chamber and thereby cause ejection, or an actuator which is made to move (for example, by heating a bi-layer element) and thereby cause ejection. In any case, electrical pulses from electrical pulse source 16 are sent to the various drop ejectors according to the desired deposition pattern. In the example of FIG. 1, droplets 181 ejected from the first nozzle array 120 are larger than droplets 182 ejected from the second nozzle array 130, due to the larger nozzle opening area. Typically other aspects of the drop forming mechanisms (not shown) associated respectively with nozzle arrays 120 and 130 are also sized differently in order to optimize the drop ejection process for the different sized drops. During operation, droplets of ink are deposited on a recording medium 20.

Figure 2:
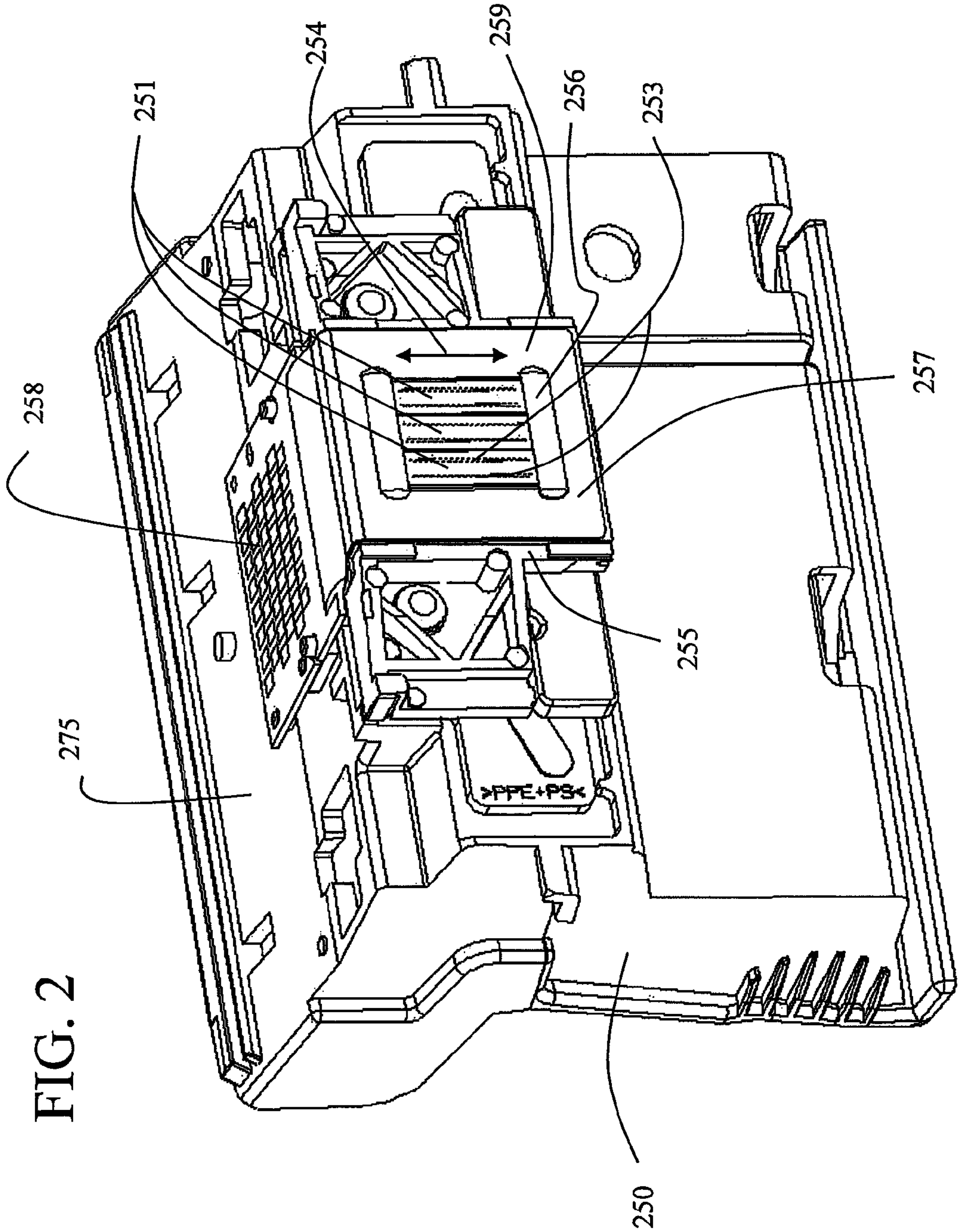
FIG. 2 is a perspective of a portion of a printhead.

FIG. 2 shows a perspective of a portion of a printhead 250, which is an example of the inkjet printhead 100. Printhead 250 includes three printhead die 251 (similar to printhead die 110 in FIG. 1) that are affixed to a mounting substrate 255. Each printhead die 251 contains two nozzle arrays 253, so that printhead 250 contains six nozzle arrays 253 altogether. The six nozzle arrays 253 in this example are each be connected to ink sources (not shown in FIG. 2), such as cyan, magenta, yellow, text black, photo black, and protective fluid. Each of the six nozzle arrays 253 is disposed along nozzle array direction 254, and the length of each nozzle array along the nozzle array direction 254 is typically on the order of 1 inch or less. Typical lengths of recording media are 6 inches for photographic prints (4 inches by 6 inches) or 11 inches for paper (8.5 by 11 inches). Thus, in order to print a full image, a number of swaths are successively printed while moving printhead 250 across the recording medium 20. Following the printing of a swath, the recording medium 20 is advanced along a media advance direction that is substantially parallel to nozzle array direction 254.

Also shown in FIG. 2 is a flexible circuit 257 to which the printhead die 251 are electrically interconnected, for example, by wire bonding or TAB bonding. Flexible circuit 257 is also adhered to mounting substrate 255, and surrounds the printhead die 250 on a printing face 259. The interconnections are covered by an encapsulant 256 to protect them. Flexible circuit 257 bends around the side of printhead 250 and connects to a connector board 258 on a rear wall 275. When printhead 250 is mounted into a carriage 200, connector board 258 is electrically connected to a connector 244 (see FIG. 6) on the carriage 200, so that electrical signals can be transmitted to the printhead die 251.

Figure 3:
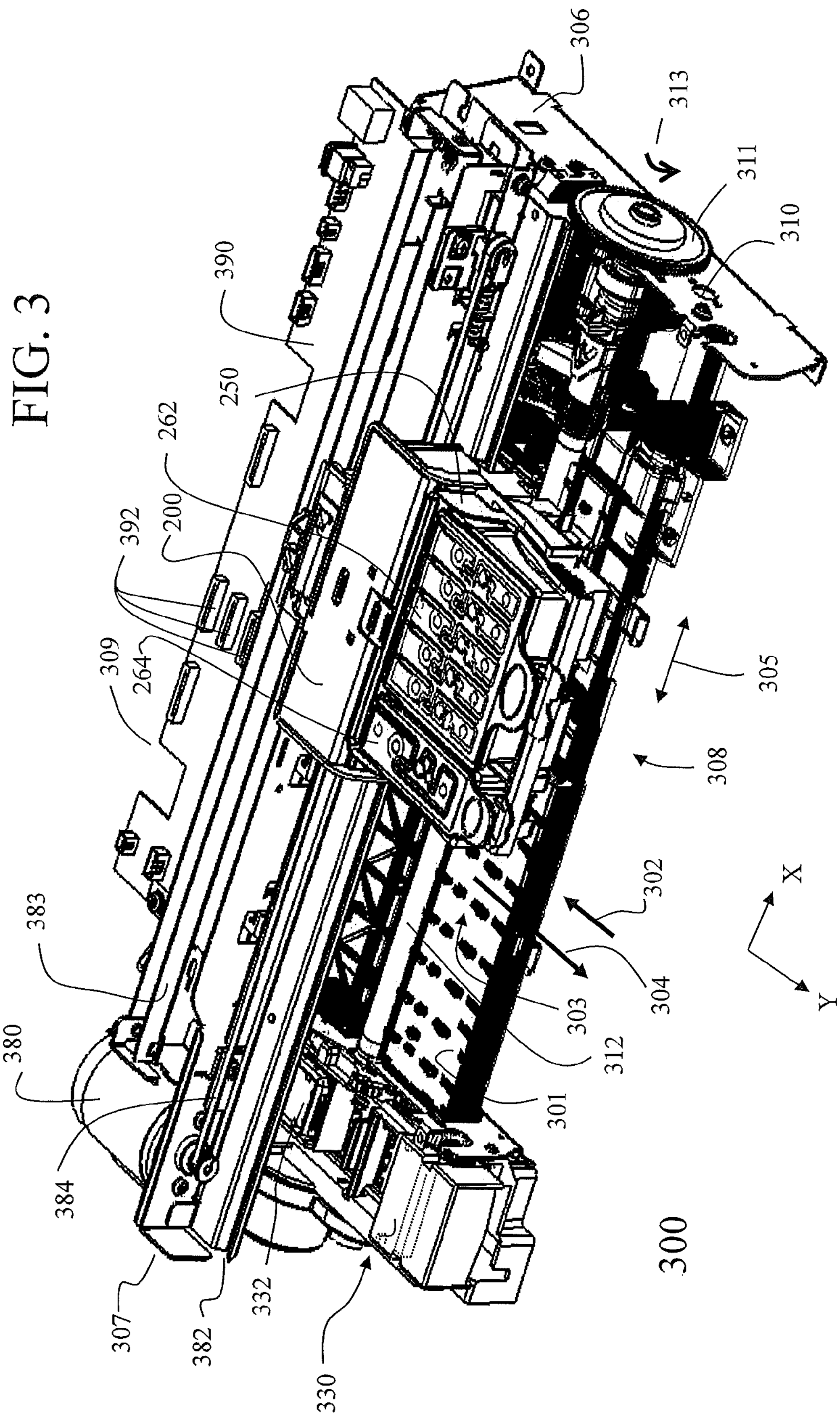
FIG. 3 is a perspective of a portion of a carriage printer.

FIG. 3 shows a portion of a desktop carriage printer. Some of the parts of the printer have been hidden in the view shown in FIG. 3 so that other parts can be more clearly seen. A printer chassis 300 has a platen 301 for supporting recording medium 20 (FIG. 1) in a print region 303 across which carriage 200 is moved back and forth in a carriage scan direction 305 between a right side 306 and a left side 307 of printer chassis 300, while drops are ejected from printhead die 251 (not shown in FIG. 3) on printhead 250 that is mounted on carriage 200. Paper or other recording medium is held substantially flat against platen 301. A carriage motor 380 moves a belt 384 to move carriage 200 along a carriage guide 382. An encoder sensor (not shown) is mounted on carriage 200 and indicates carriage location relative to a linear encoder 383.

The mounting orientation of printhead 250 is rotated relative to the view in FIG. 2, so that the printhead die 251 are located at the bottom side of printhead 250 with printing face 259 facing print region 303, the droplets of ink being ejected downward onto the recording medium (not shown) in print region 303 in the view of FIG. 3. A multi-chamber ink tank 262, in this example, contains five ink sources: cyan, magenta, yellow, photo black and colorless protective fluid; while a single-chamber ink tank 264 contains the ink source for text black. Ink tanks 262 and 264 can include electrical contacts (not shown) for data storage devices, for example, to track ink usage. In other arrangements, rather than having a multi-chamber ink tank to hold several ink sources, all ink sources are held in individual single chamber ink tanks.

Figure 4:
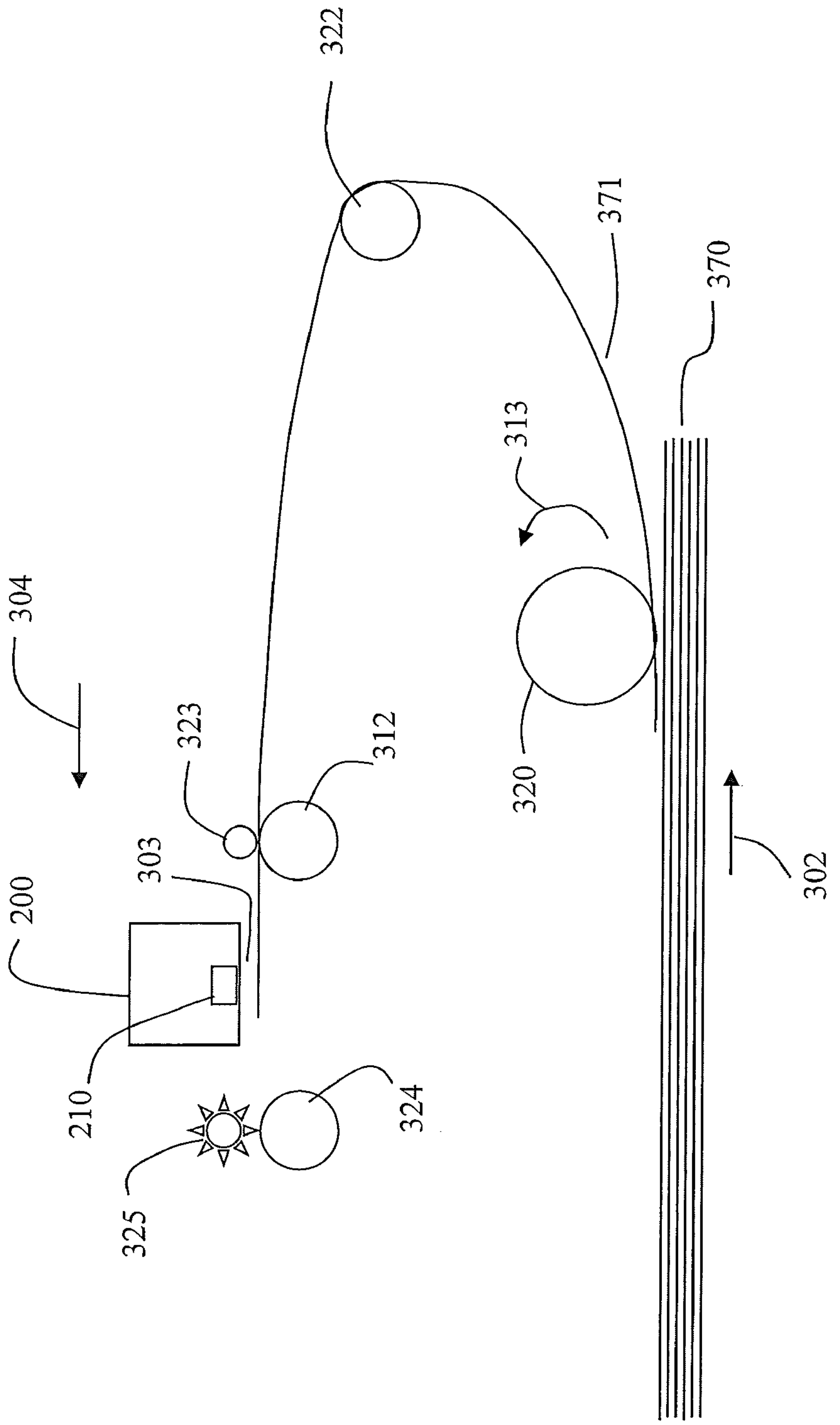
FIG. 4 is a schematic side view of an exemplary paper path in a carriage printer.

Paper or other recording medium (sometimes generically referred to as paper or media herein) is loaded along paper load entry direction 302 toward the front of printer chassis 308. A variety of rollers are used to advance the medium through the printer as shown schematically in the side view of FIG. 4. In this example, a pick-up roller 320 moves a top piece or sheet 371 of a stack 370 of paper or other recording medium in the direction of arrow, paper load entry direction 302. A turn roller 322 acts to move the paper around a C-shaped path (in cooperation with a curved rear wall surface) so that the paper continues to advance along a media advance direction 304 from the rear 309 of the printer chassis (with reference also to FIG, 3). The paper is then moved by a feed roller 312 and idler roller(s) 323 to advance across print region 303 (platen not shown), and from there to a discharge roller 324 and star wheel(s) 325 so that printed paper exits along media advance direction 304. Feed roller 312 includes a feed roller shaft along its axis, and feed roller gear 311 is mounted on the feed roller shaft. Feed roller 312 can include a separate roller mounted on the feed roller shaft, or can include a thin high friction coating on the feed roller shaft. A rotary encoder (not shown) can be coaxially mounted on the feed roller shaft in order to monitor the angular rotation of the feed roller 312.

When the piece of medium 371 is in print region 303 below carriage 200, it can be detected by a carriage sensor 210 that is mounted on carriage 200. Carriage sensor 210 can be used for detecting surface roughness of the recording medium, side edges of the recording medium, and alignment marks and test patterns printed on the recording medium, for example.

The motor that powers the paper advance rollers is not shown in FIG. 3, but the hole 310 at the right side of the printer chassis 306 is where the motor gear (not shown) protrudes through in order to engage feed roller gear 311, as well as the gear for the discharge roller (not shown). For normal paper pick-up and feeding, it is desired that all rollers rotate in forward rotation direction 313. Toward the left side of the printer chassis 307, in the example of FIG. 3, is a maintenance station 330 including a cap 332 and a wiper (not shown).

Toward the rear of the printer chassis 309, in this example, is located an electronics board 390, which includes cable connectors 392 for communicating via cables (not shown) to the printhead carriage 200 and from there to the printhead 250. Also on the electronics board 390 are typically included motor controllers for the carriage motor 380 and for the paper advance motor, a processor and/or other control electronics (shown schematically as controller 14 and image processing unit 15 in FIG. 1) for controlling the printing process, a clock and an optional connector for a cable to a host computer.

Figure 5:
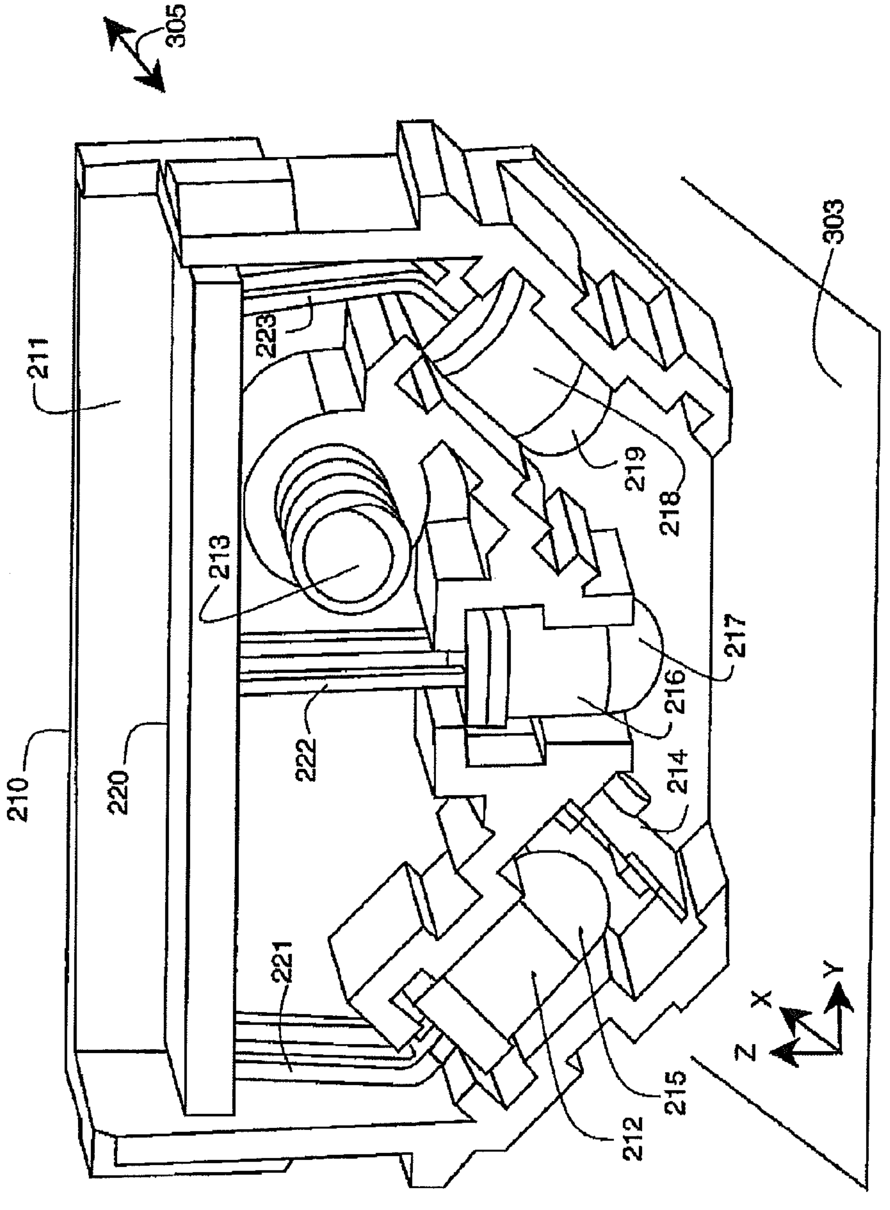
FIG. 5 Prior Art
FIG. 5 is a perspective of prior art carriage sensor assembly.

FIG. 5 shows a perspective of a prior art carriage sensor assembly 210 described in U.S. Pat. No. 7,800,089. A frame 211 of carriage sensor 210 can be attached to the outside of side wall 242 (see FIG. 6) of carriage 200 by bolt 213, for example. Also shown in carriage sensor assembly 210 are a photosensor 212, an aperture 214, a first LED 216 and a second LED 218. The photosensor 212 and the two LEDs 216 and 218 include semiconductor devices (not shown) that are encapsulated in optically clear materials that form lenses (215, 217 and 219 respectively). Lens 215 helps to focus light received through aperture 214 onto the photosensor device, while LEDs 216 and 218 help to direct the emitted light toward the plane of the recording medium. Electrical leads 221, 222 and 223 from the photosensor 212 and the two LED's 216 and 218 are connected to a wiring board 220, and from the wiring board 220 to leads (not shown) that can be connected to a carriage electronics board (not shown) that is attached to the carriage 200. It is preferable for the amplifier circuit to be physically close to the photosensor 212, because the photosensor output signal is relatively weak and it is important to avoid extraneous electrical noise, for example from printer motor cables, etc. The electronics board 390 attached to carriage 200 can include the electronics for the powering of the LEDs 216 and 218 and for processing the photosensor signal.

FIG. 5 shows an orientation of carriage sensor 210 that is appropriate for a configuration in which the recording medium in the print region 303 is located horizontally below the printhead 250 and the carriage sensor 210 which are mounted on carriage 200. First LED 216 is oriented to emit light vertically downward along the Z direction, i.e. substantially normal to the XY plane of the recording medium in the print region 303. In other words, the angle between the orientation of LED 216 and the normal to a plane parallel to the platen 301 is zero. The platen 301 can have regions of recesses as well as a series of protrusions for supporting the paper, but in such a configuration "a plane parallel to the platen" is meant herein to designate a plane that is determined by the surfaces of the protrusions upon which recording medium 20 is intended to be supported. Photosensor 212 is configured to be on one side of first LED 216, and photosensor 212 is oriented to receive light along a direction that is at an angle of about 45 degrees with respect to the normal Z to the XY plane of the platen 301 (and pointing toward the back of the printer so that it does not receive external stray light). Second LED 218 is configured to be on the other side of first LED 216, and second LED 218 is oriented to emit light at substantially the same angle with respect to the normal Z, as the photosensor 212, but on the other side of the normal. In this example, second LED 218 is oriented to emit light along a direction that is around 45 degrees from the normal to the plane of the recording medium 20 in the print region 303. In other embodiments, the angle between the normal Z and the photosensor 212 on one side and LED 218 on the other side can range between around 30 and 60 degrees, but the angle for each should be the same. Thus, the two LEDs 216, 218 are configured relative to the photosensor in this carriage sensor

210 such that the photosensor 212 receives specular reflections of light incident on the recording medium 20 from second LED 218, and photosensor 212 receives diffuse reflections of light incident on the recording medium 20 from first LED 216. Photosensor 212 provides an output signal (typically an output current) corresponding to the amount of light that strikes the photosensor 212.

Aperture 214 determines the range of angles of incident light rays that are able to pass to the photosensor 212, while the opaque region around the aperture blocks light rays outside this range of angles. The region of the recording medium 20 that the photosensor 212 "sees" depends not only on the geometry of the aperture 214, but also upon its orientation relative to the plane of the recording medium 20. The use of the aperture 214 enables the use of inexpensive off-the-shelf LEDs 216, 218 and photosensor 212 without requiring special lens designs for those components. In this example, the axis of the aperture 214 is parallel to the axis of the photosensor 212, and both are oriented at an angle with respect to the normal to the platen 301.

Figure 6:
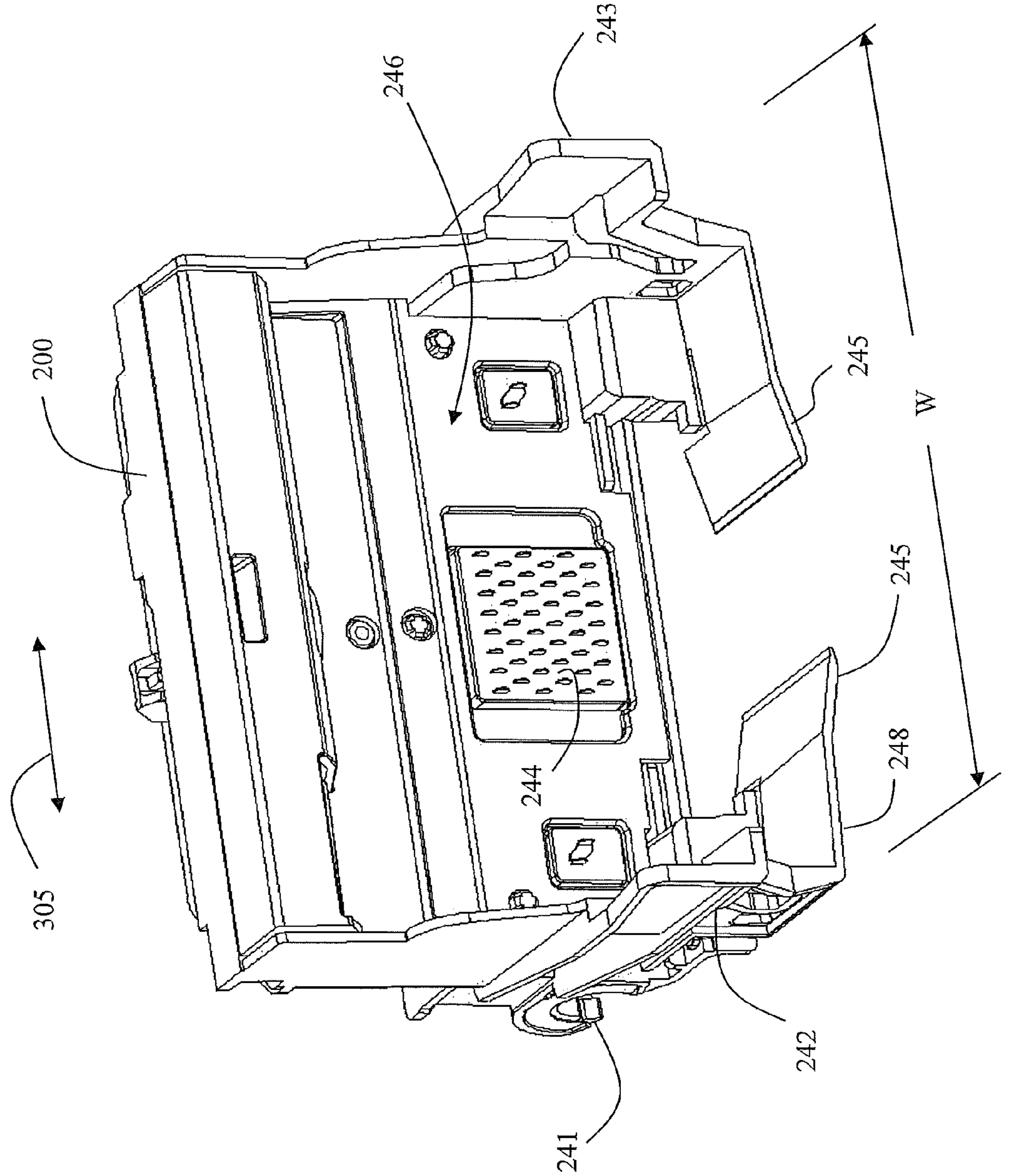
FIG. 6 is a perspective of a carriage.

FIG. 6 is a perspective of the carriage 200 configured to carry printhead 250 (FIG. 2). Printhead 250 is oriented such that the printhead face 259 (FIG. 2) including printhead die 251 and flex circuit 257 are positioned between flaps 245 when printhead 250 is installed in a holding receptacle 246 of carriage 200. Flaps 245 extend from side walls 242 and 243 of carriage 200 and form a wall 248 facing print region 303 (FIG. 3) when the printhead 250 and carriage 200 are installed in the printer chassis 300. Herein the portion of carriage 200 extending from side walls 242 and 243 and facing print region 303 is called a wall 248, even though it is a discontinuous wall including an opening between adjacent flaps 245 to expose printhead die 251 for printing and flex circuit 257, providing a capping surface for cap 332 (FIG. 3). Connector board 258 of printhead 250 is mated to connector 244 of carriage 200 when printhead 250 is installed. A bushing 241 of carriage 200 is slidably engaged with carriage guide 382 (FIG. 3) in order to provide smooth motion of carriage 200 along carriage scan direction 305. As described above, the prior art carriage sensor 210 was bolted to the outer side of side wall 242.

Embodiments of the present invention provide a more compact carriage sensor than prior art carriage sensor 210. The more compact carriage sensor can be mounted on the wall (such as wall 248) that faces print region 303, rather than being bolted to the outer portion of side wall 242. This can save several millimeters along carriage scan direction 305, so that even in small footprint printers, both side edges of even the widest compatible recording medium in print region 303 can be detected by the carriage sensor described below. Side wall 242 is a first outer wall and side wall 243 is a second outer wall that is separated from the first outer wall of carriage 200 by a carriage width W along carriage scan direction 305 as shown in FIG. 6. The carriage sensor described in U.S. Pat. No. 7,800,089, being bolted to the outer side of side wall 242, is disposed at a distance from the first outer wall (side wall 242) that is less than carriage width W, but it is disposed at a distance from the second outer wall (side wall 243) by a distance that is greater than carriage width W. By contrast, an optical sensor assembly 410 described in an embodiment below is disposed at a first distance from the first outer wall 242 and at a second distance from the second outer wall 243, such that the first distance and the second distance are both less than the carriage width. In addition, assembly is simpler, lower cost and positioning is more accurate, using snap fitting assembly. Wiring is also simplified, using a flexible circuit to mount both LED light sources and the photosensor, rather than having discrete leads 221, 222 and 223 (FIG. 5) connected to a wiring board 220.

Figure 7:
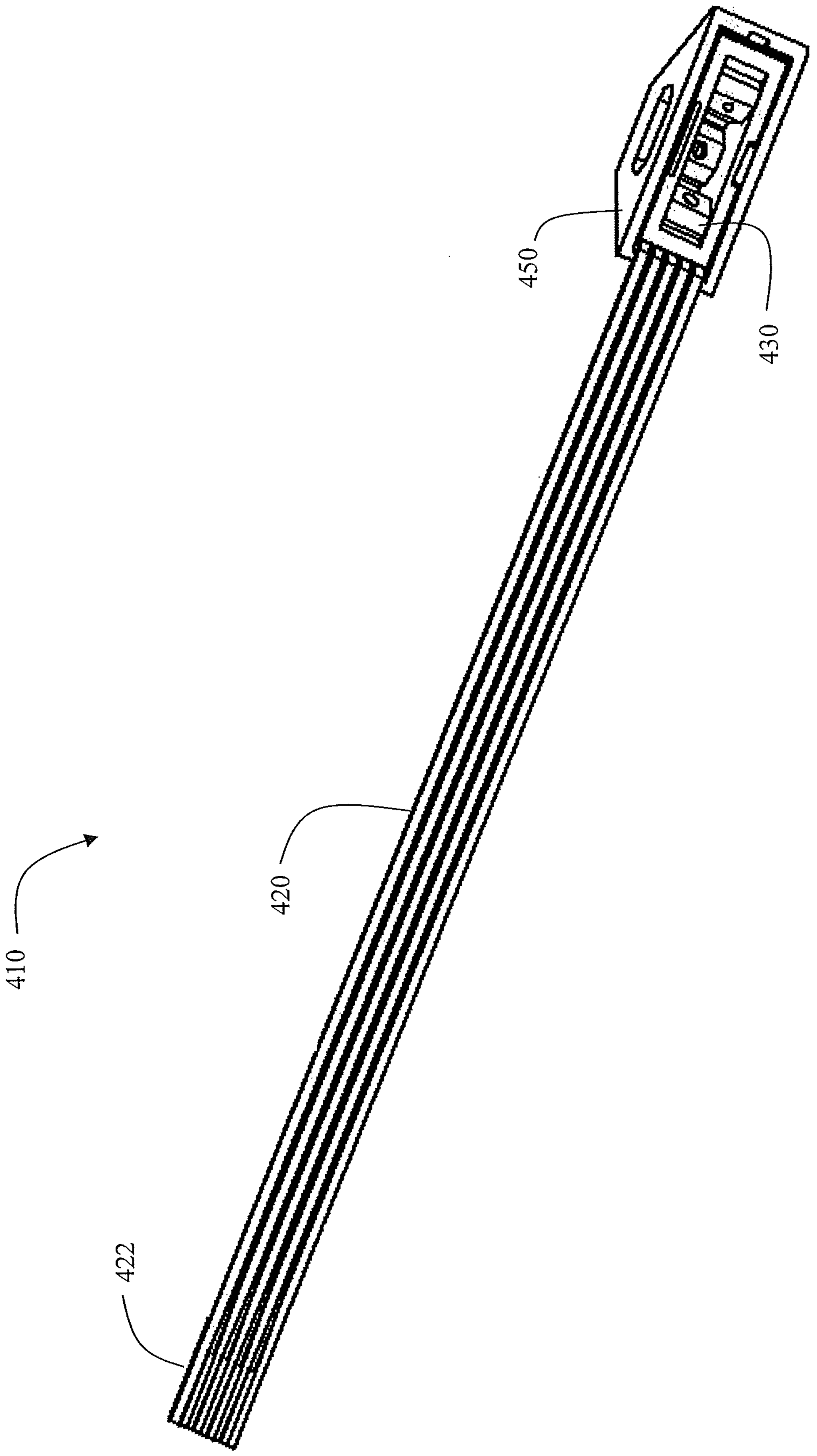
FIG. 7 is perspective of an embodiment of an optical sensor assembly.

A perspective of the optical sensor assembly 410 that can be used as a carriage sensor in embodiments of the invention is shown in FIG. 7. Like the prior art carriage sensor 210, optical sensor assembly 410 is affixed to a carriage 200, the position of which is carefully controlled and monitored with respect to linear encoder 383 (FIG. 3), so that distances (such as those used in measurements of printhead alignment targets, dot placement accuracy, or paper width) can be accurately measured. The optical devices (i.e. the photosensor 212 and LEDs 216, 218) are not readily seen in the view of FIG. 7, being disposed on a mounting member 430 that is within an outer housing 450. The optical devices are electrically connected to a flexible circuit 420 to form a flexible circuit subassembly 421. A connector end 422 of the flexible circuit subassembly 421 extends outwardly from the mounting member 430 and outer housing 450.

Figure 8:
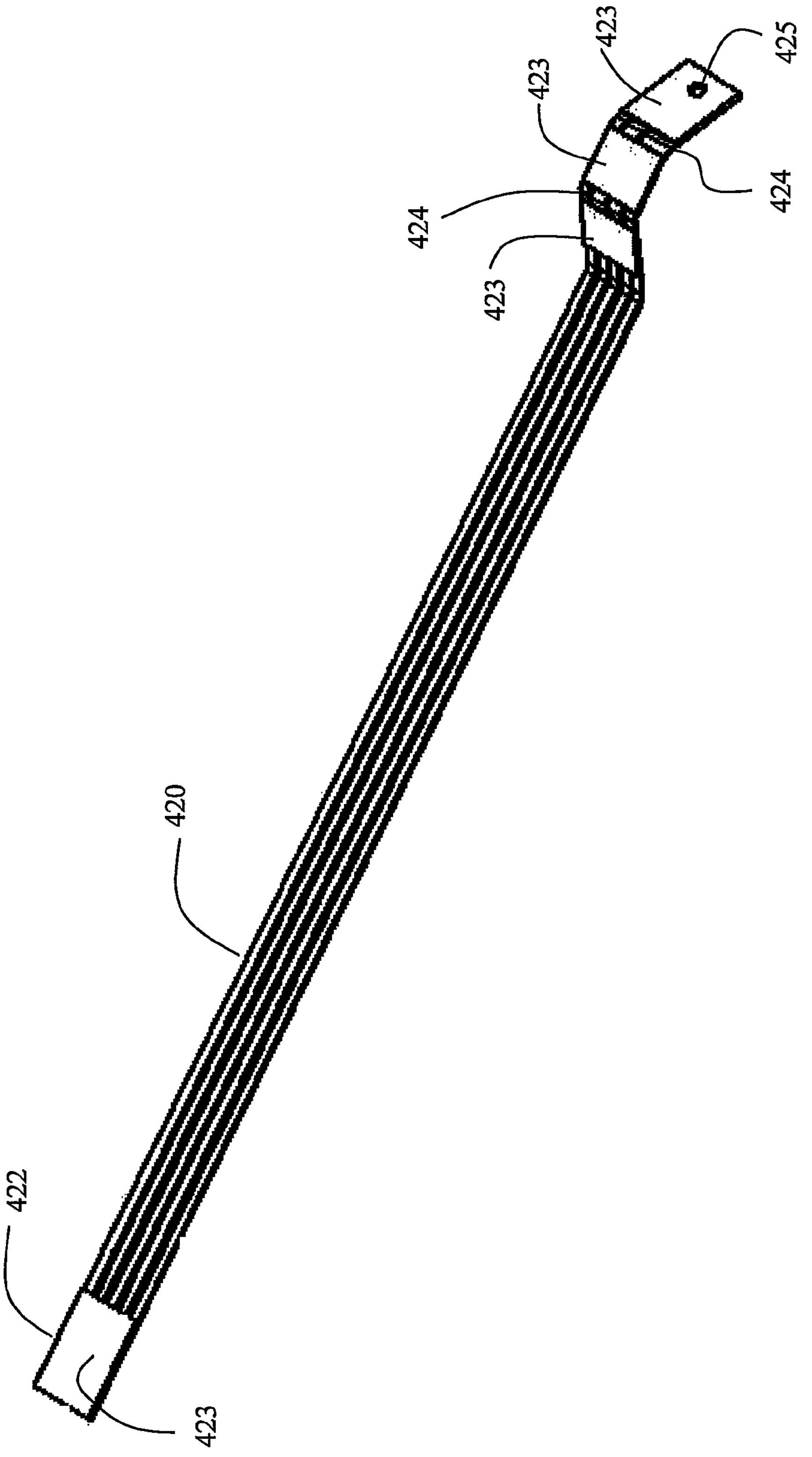
FIG. 8 is a perspective of a flexible circuit included in the embodiment of FIG. 7.

A perspective of flexible circuit 420 (rotated relative to FIG. 7 and with mounting member 430 and outer housing 450 hidden) is shown in FIG. 8. A rigid member 423 is attached to flexible circuit 420 at connector end 422 (for support during connecting connector end 422). In addition there are three rigid members 423 at the opposite end of flexible circuit 420, each for providing support to an optical devices (not shown) as described below. Flexible regions 424 between the rigid members (in the region of the optical devices) are bent so that the optical devices can be oriented to detect specular and diffuse reflections as described above relative to prior art carriage sensor 210. A hole 425 is provided as a locating feature for flexible circuit 420.

Figure 9:
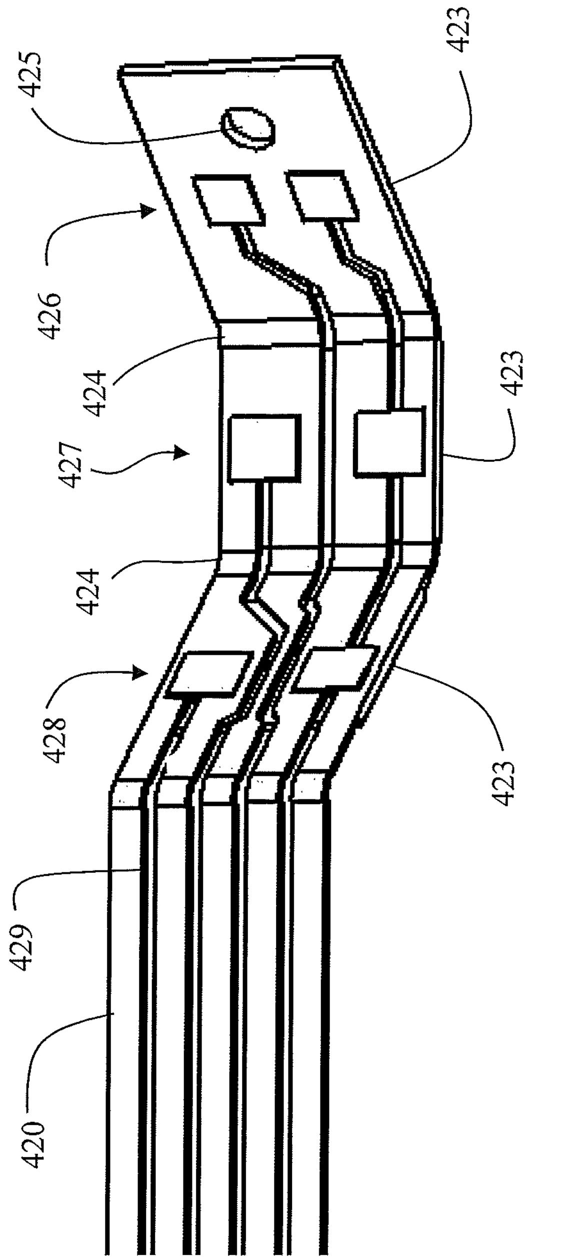
FIG. 9 is a close-up perspective of a portion of the flexible circuit of FIG. 8.

FIG. 9 shows a close-up underside perspective of flexible circuit 420. A first set of electrical connection pads 426 is provided near hole 425. A second set of electrical connection pads 427 is provided proximate first set of electrical connection pads 426, with a bend disposed in flexible region 424 between the two sets. Similarly, a third set of electrical connection pads 428 is provided proximate second set of electrical connection pads 427, with a bend disposed in flexible region 424 between the two sets. The three rigid members 423 at the optical device mounting end of the flexible circuit 420 are disposed opposite the respective sets of connection pads in order to provide mechanical support for the optical devices to be bonded there. Conductive leads 429 extend from each of the electrical connection pads. There are a total of four leads 429, because one member of each of the three sets 426, 427 and 428 is connected to a common lead.

Figure 10:
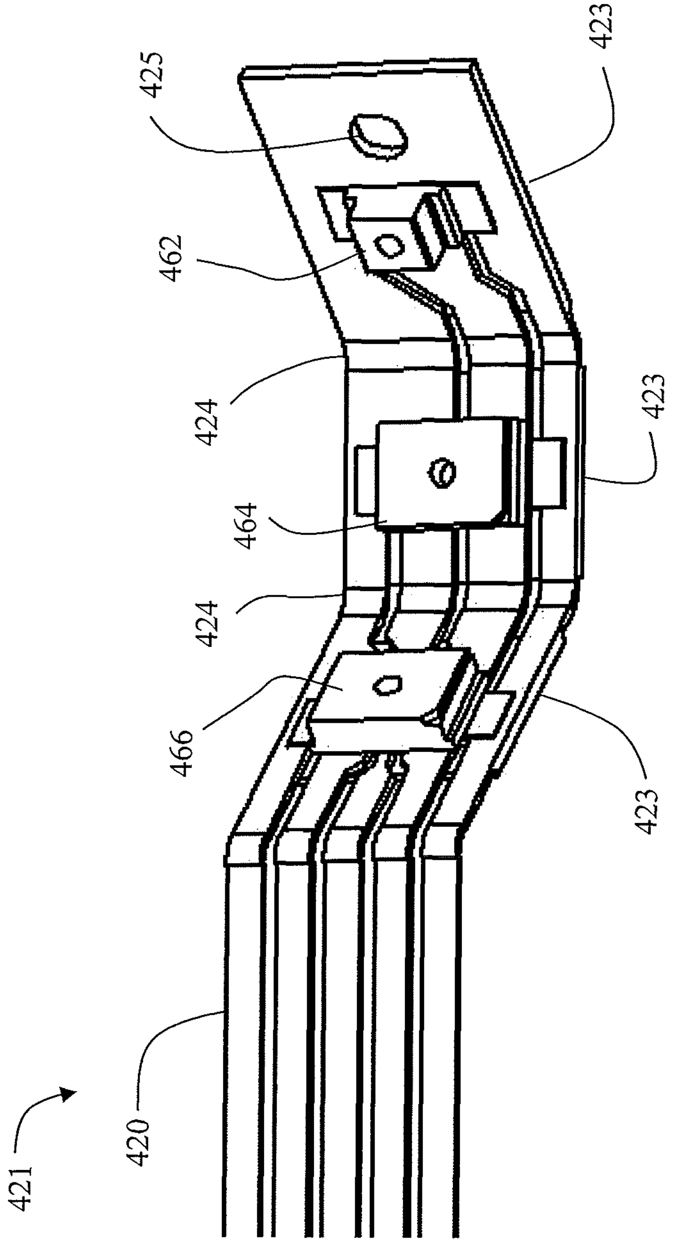
FIG. 10 is a perspective that is similar to FIG. 9, but also including a photosensor and two light sources.

FIG. 10 shows a perspective similar to that of FIG. 9, but after the optical devices have been attached to flexible circuit 420, thereby forming a flexible circuit subassembly 421. In particular, with reference also to FIG. 9, a photosensor 462 is conductively attached to first set of electrical connection pads 426; first light source (LED) 464 is conductively attached to second set of electrical connection pads 427; and a second light source (LED) 466 is conductively attached to third set of electrical connection pads 428. By providing the bends in flexible regions 424 of flexible circuit 420, an orientation of the first light source 464 is made to be different from an orientation of the second light source 466, and both orientations are different from an orientation of the photosensor 462. In this way, similar to the carriage sensor 210 shown in FIG. 5 and described above, photosensor 462 can sense light emitted from first light source 464 and diffusely reflected from recording medium in print region 303, as well as light emitted from second light source 466 and specularly reflected from recording medium in print region 303. In other embodiments only a single light source 464 or 466 is provided together with photosensor 462 on flexible circuit subassembly 421.

Figure 11:
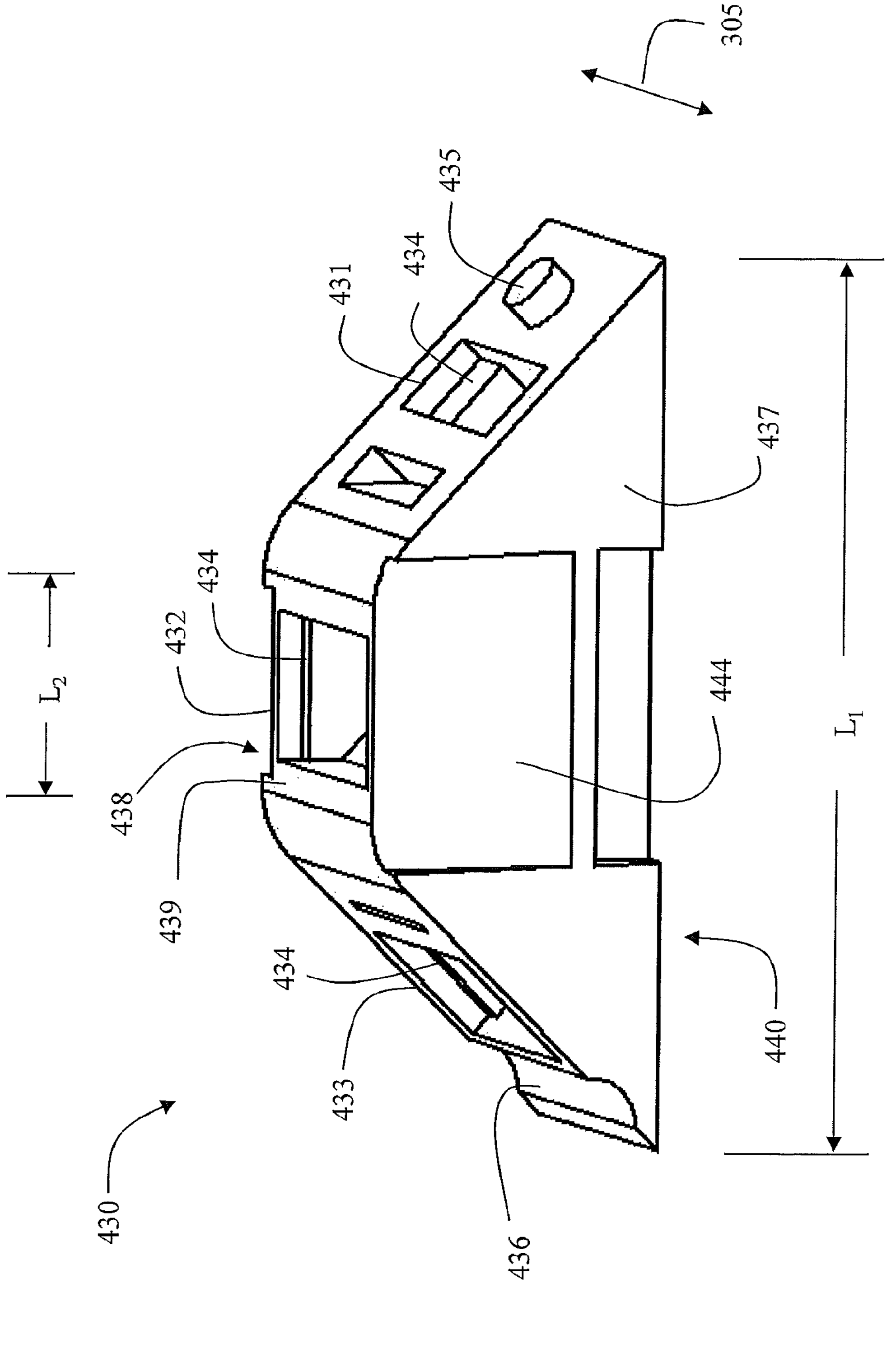
FIG. 11 is a perspective of a mounting member included in the embodiment of FIG. 7.
Figure 12:
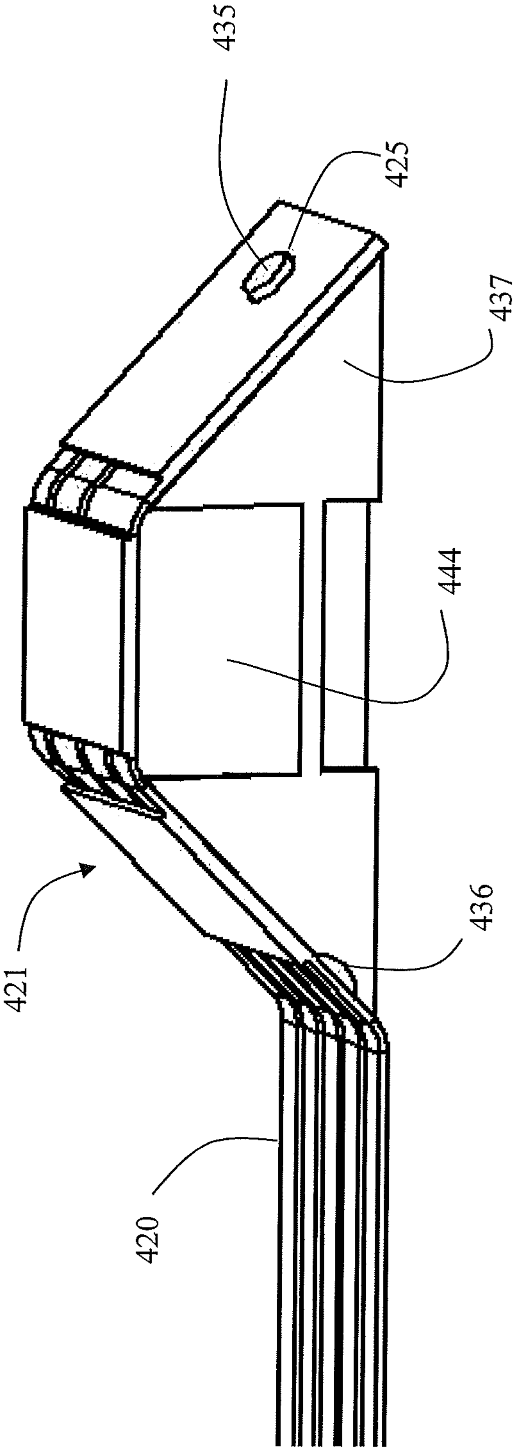
FIG. 12 is a perspective similar to that of FIG. 11, but also including the flexible circuit of FIG. 8.

Orientations of photosensor 462, first light source 464 and second light source 466 are further established by features of mounting member 430 shown in the perspective of FIG. 11. Mounting member 430 includes a first cavity 431, a second cavity 432 and a third cavity 433. In each of the three cavities 431, 432 and 433 are shelf-like support features 434 for supporting the photosensor 462, the first light source 464 and the second light source 466 respectively (FIG. 10) in their desired orientations. Mounting member 430 also includes a post-like projection 435 for locating the flexible circuit subassembly 421 as shown in FIG. 12 by inserting projection 435 into hole 425. A first pinching portion 436 is used to pinch a portion of the flexible circuit 420 between mounting member 430 and outer housing 450.

Mounting member 430 includes an open face 440 (seen more clearly in the bottom perspective shown in FIG. 13), and a second face 439 that is opposite the open face 440. Second face 439 is where second cavity 432 is located. When mounting member 430 is installed in carriage 200 in printer chassis 300 (FIG. 3), open face 440 faces print region 303. Open face 440 includes a first length $L_1$ that is along a direction perpendicular to carriage scan direction 305 when mounting member 430 is installed in carriage 200, which is installed in printer chassis 300 (FIG. 3). Second face 439 includes a second length $L_2$ along the direction perpendicular to carriage scan direction 305. First length $L_1$ is greater than second length $L_2$. A first side wall 437 of mounting member 430 extends from open face 440 to second face 439 and includes a first tapered portion 444. A second side wall 438 is opposite first side wall 437 and includes a second tapered portion 445 (see FIG. 14) that is opposite first tapered portion 444.

Figure 13:
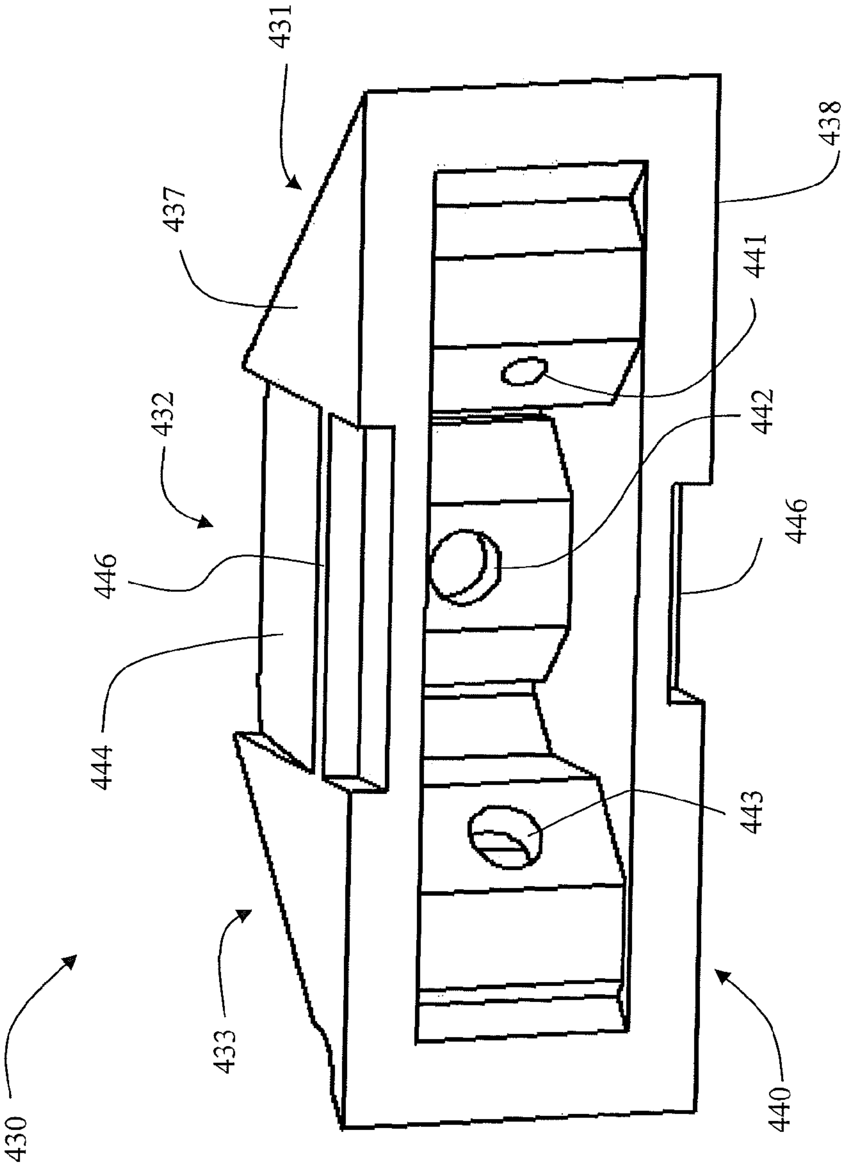
FIG. 13 is a bottom perspective of the mounting member of FIG. 11.
Figure 14:
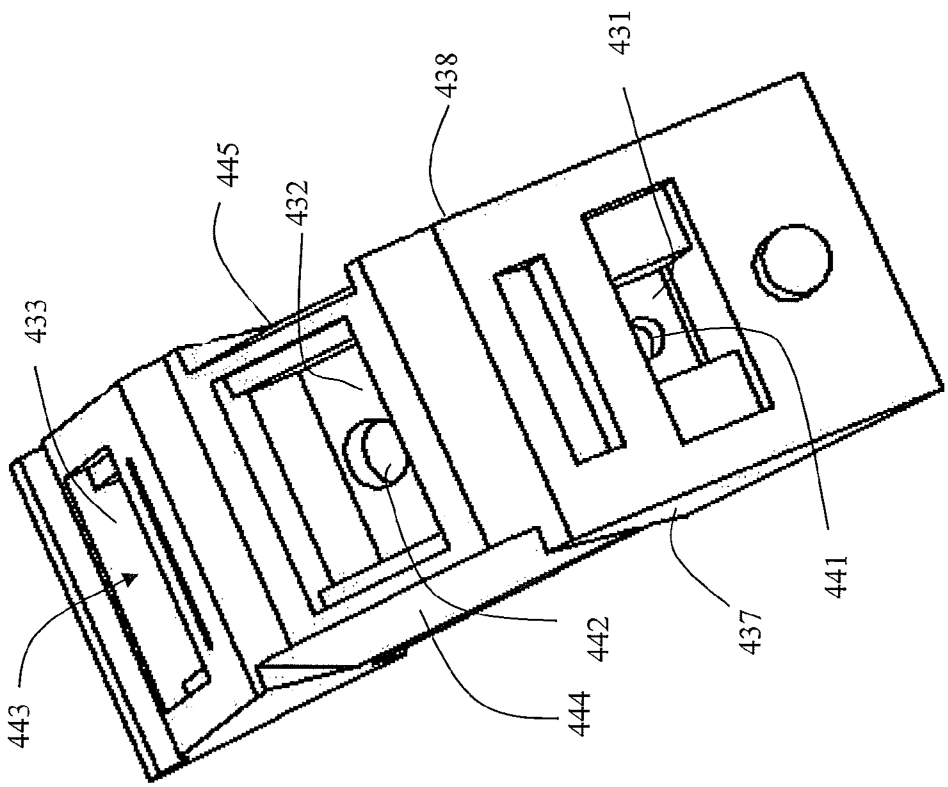
FIG. 14 is a top perspective of the mounting member of FIG. 11.

Included with each of the cavities 431, 432 and 433 of mounting member 430 is a respective aperture 441, 442 and 443, as shown in the bottom perspective of FIG. 13 and the top perspective of FIG. 14. First aperture 441 determines the field of view of photosensor 462 (not shown in FIG. 13). Second aperture 442 and third aperture 443 determine optical transmission regions for first light source 464 and second light source 466 respectively. In other words, first aperture 441, second aperture 442 and third aperture 443 are configured to permit light emitted from the first or second light source (464 and 466 respectively) and reflected from print region 303 (FIG. 3) to impinge on photosensor 462. A second function of apertures 441, 442 and 443 is to limit the amount of ink mist that is able to land on photosensor 462, first light source 464 and second light source 466. As described below, in embodiments of the present invention, the optical sensor assembly 410 is located nearer to the nozzle arrays 253 of an inkjet printhead 250 as compared to carriage sensors of the prior art. The function of limiting mist deposition on the optical devices is an important function of apertures 441, 442 and 443.

Also shown in FIG. 13 near the first tapered portion 444 of first side wall 437 of mounting member 430 is a first latching feature 446. A similar first latching feature 446 is located near the second tapered portion 445 of the second side wall 438 (FIG. 14). As described below with reference to FIGS. 15 and 16, the first latching features 446 of the mounting member 430 engage with second latching features 456 of outer housing 450 when mounting member 430 is snap fitted into outer housing 450.

Figure 15:
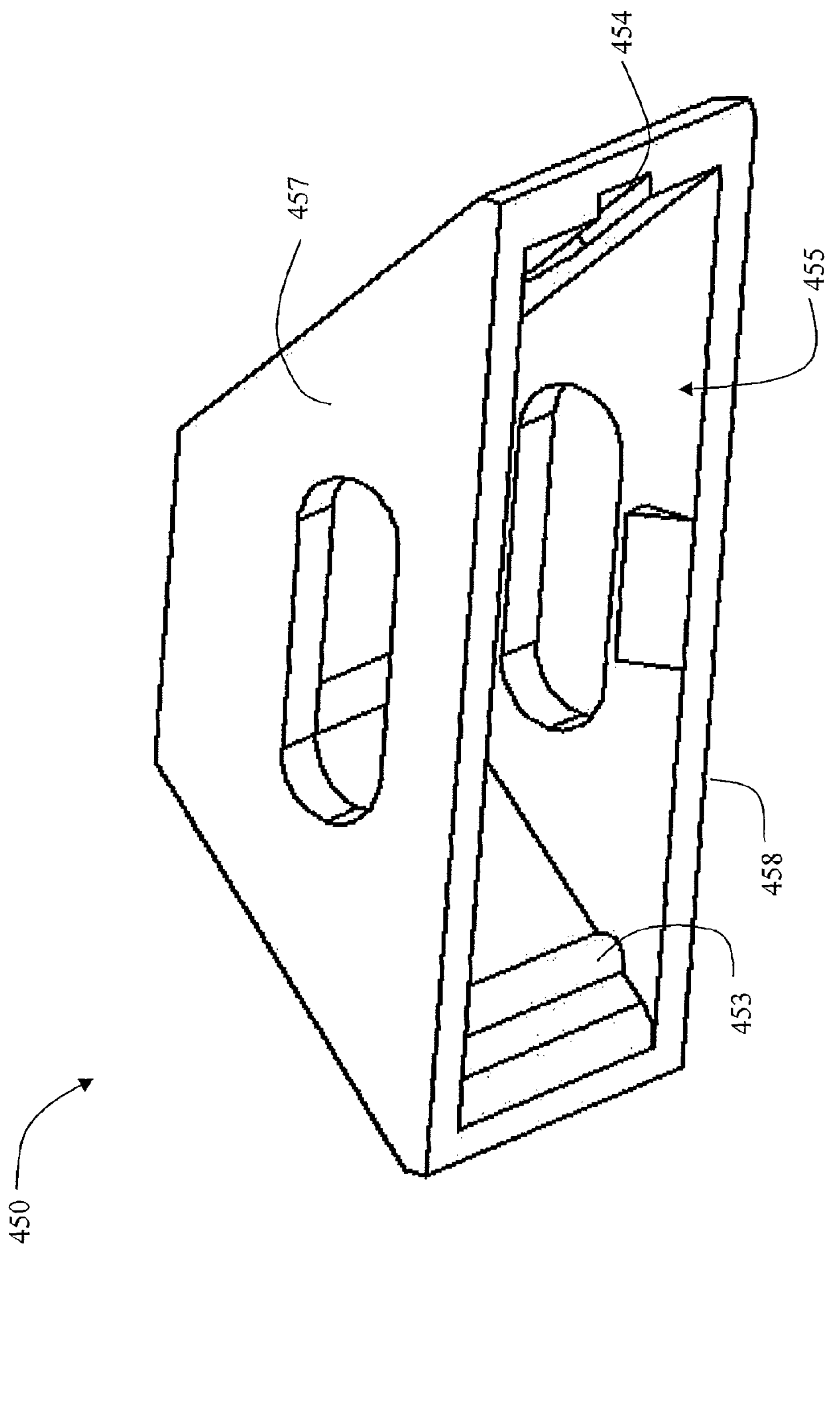
FIG. 15 is a perspective of an outer housing included in the embodiment of FIG. 7.
Figure 16:
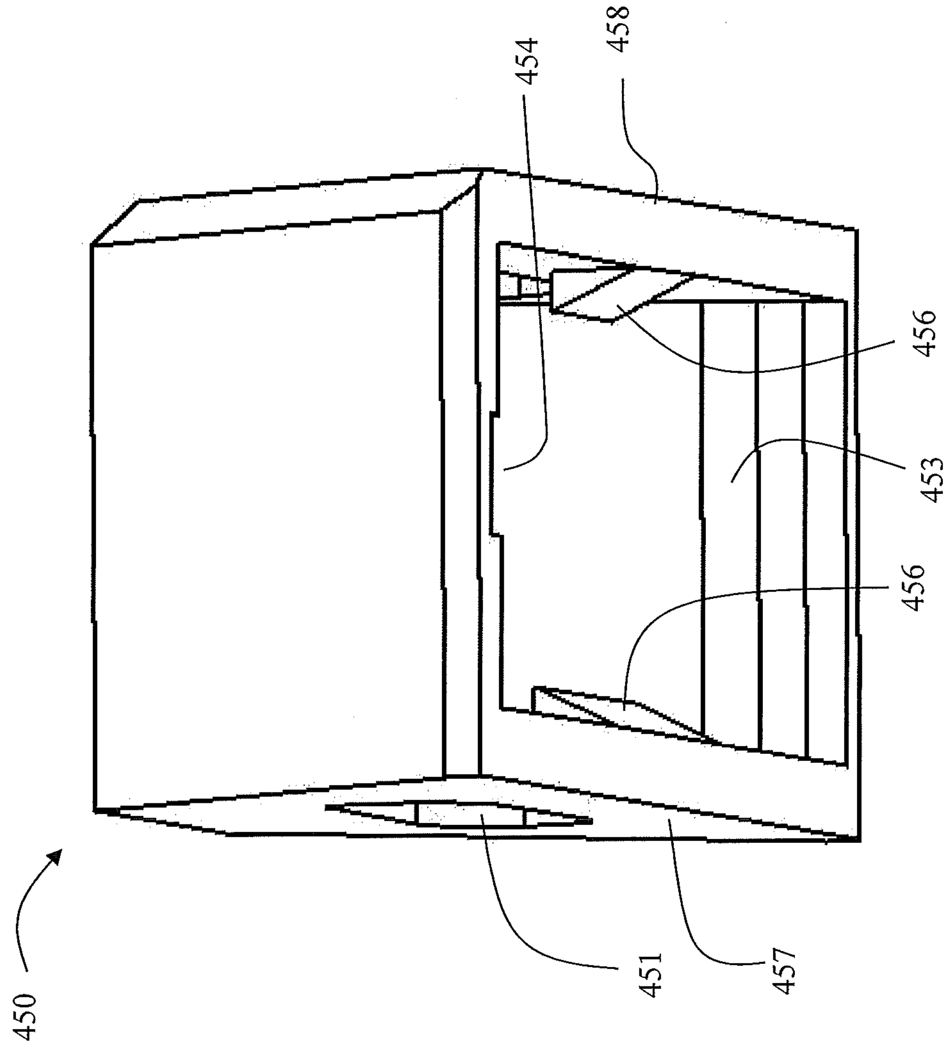
FIG. 16 is a bottom end perspective of the outer housing of FIG. 15.

FIG. 15 shows outer housing 450 from a perspective showing that outer housing 450 has a similar trapezoidal shape as mounting member 430 (FIG. 11). Outer housing 450 includes an open portion 455 that is located near open face 440 (FIG. 13) of mounting member 430 when outer housing 450 is assembled onto mounting member 430. With reference also to FIG. 13, outer housing 450 includes a first housing side wall 457 that is adjacent first side wall 437 of mounting member 430 and a second housing side wall 458 that is adjacent to second side wall 438 of mounting member 430 when the outer housing is assembled onto mounting member 430. To facilitate snap fitting of mounting member 430 into outer housing 450, first housing side wall 457 and second housing side wall 458 are configured to be outwardly deformable. Windows 451 provide additional flexibility to the first and second housing side walls 457 and 458. With reference also to the bottom end perspective of FIG. 16, wedge-shaped second latching features 456 on first and second housing side walls 457 and 458 are provided to engage with first latching features 446 on mounting member 430 (FIG. 13). As described below, as the first and second tapered portions 444 and 445 of first and second side walls 437 and 438 of mounting member 430 are slidingly moved past wedge-shaped second latching features 456 of outer housing 450, first and second housing side walls 457 and 458 are outwardly deformed until first latching features 446 have been moved past second latching features 456 and into engagement as the first and second housing side walls 457 and 458 snap back into their original undeformed shapes. With reference also to FIG. 15, second pinching portion 453 is provided on outer housing 450 in order to pinch a portion of flexible circuit 420 against a first pinching portion 436 of mounting member 430, thereby providing strain relief. Also included on outer housing 450 is recess 454 in order to accommodate projection 435 of mounting member 430 (FIG. 12), as mounting member 430 is inserted into outer housing 450.

Figure 17:
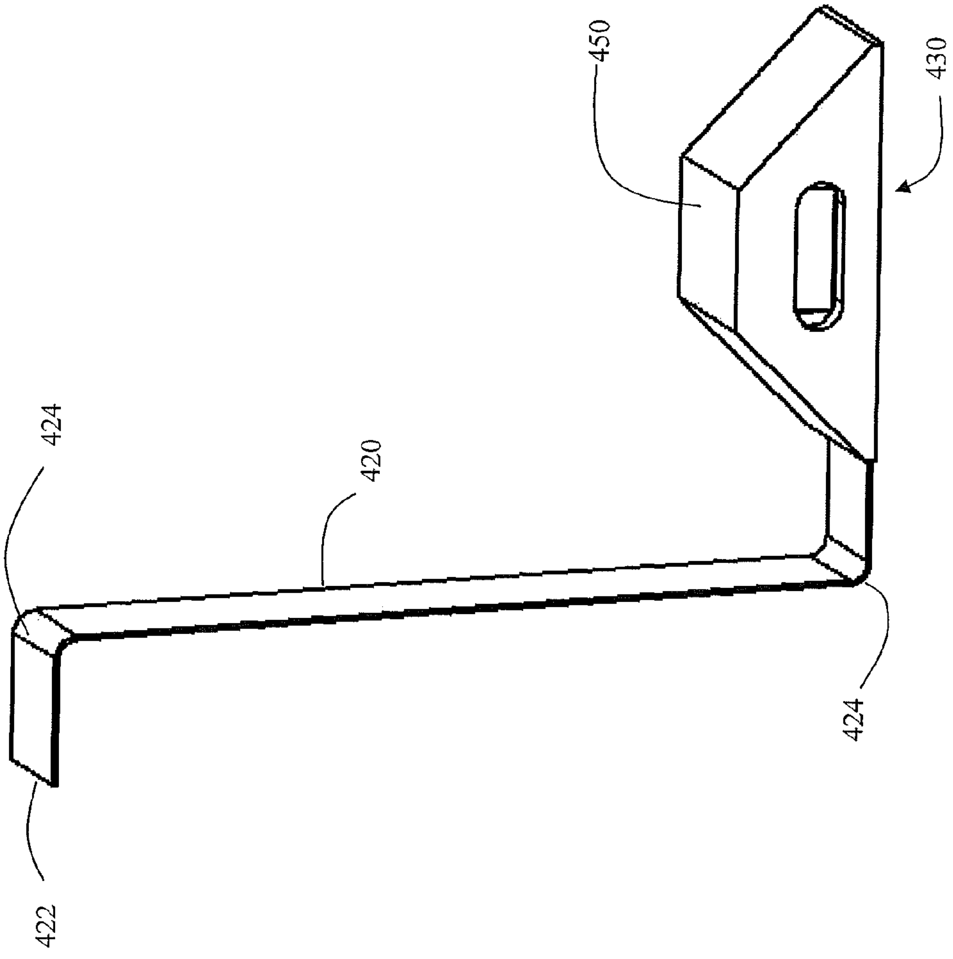
FIG. 17 is a perspective of an embodiment of an optical sensor assembly.

FIG. 17 shows a perspective of optical sensor assembly 410, where flexible circuit 420 extends from the outer housing 450 and mounting member 430. In this example, additional bends have been made in flexible regions 424 near connector end 422 of flexible circuit 420, as well as near outer housing 450. Such bends can be useful for positioning connector end 422 such that it can be electrically connected to a carriage electronics board (not shown) on carriage 200.

Figure 18:
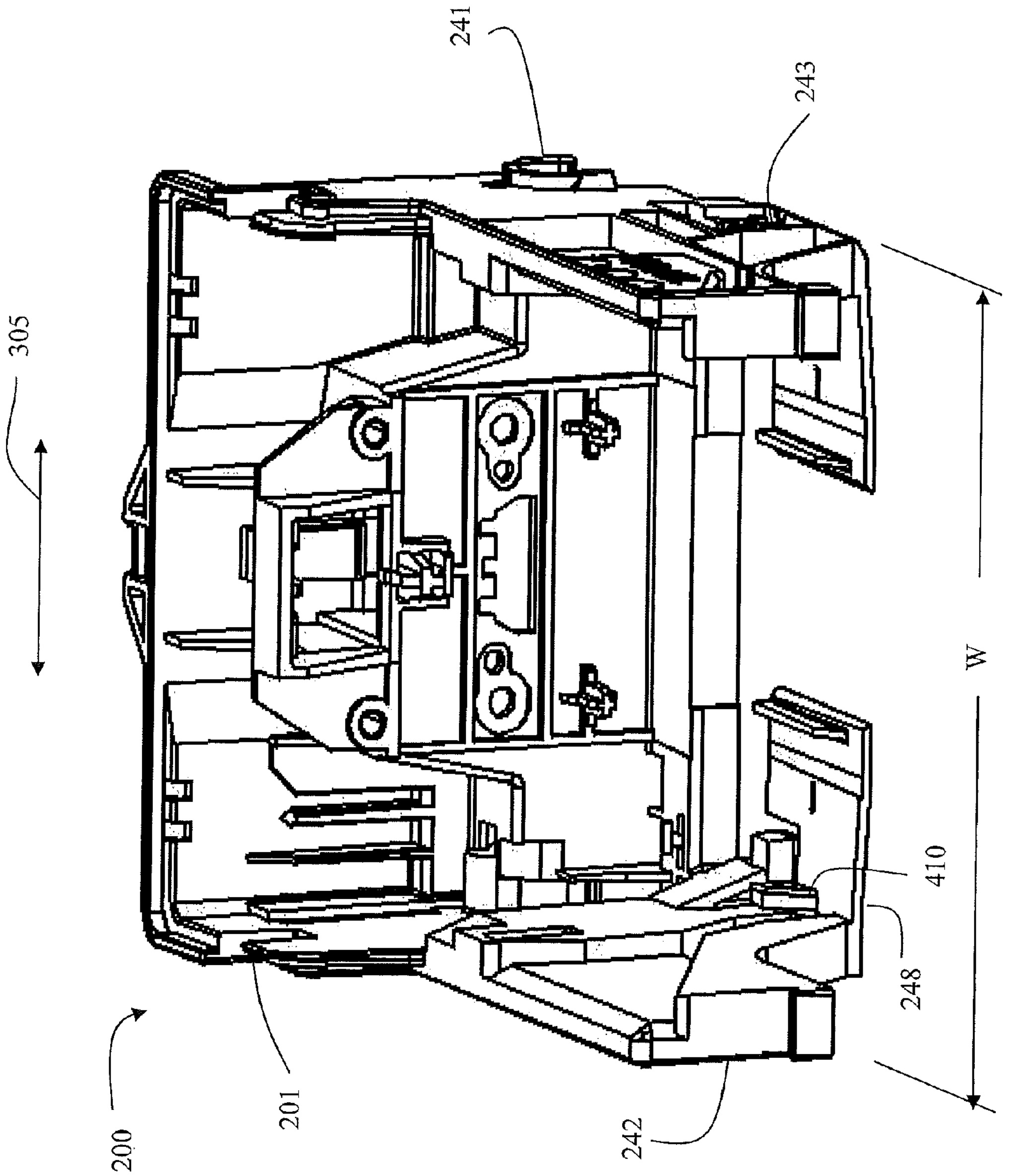
FIG. 18 is a perspective of an embodiment of a carriage including an optical sensor assembly.

FIG. 18 shows a top perspective of carriage 200 with optical sensor assembly 410 disposed next to outer side wall 242, between outer side walls 242 and 243 of carriage frame 201. Outer side wall 242 is separated from outer side wall 243 by a carriage width W along carriage scan direction 305. Optical sensor assembly 410 is disposed on carriage 200 at a first distance from outer side wall 242 and at a second distance from outer side wall 243, such that both the first distance and the second distance are less than carriage width W. With reference also to FIG. 3, the wall facing print region 303 when carriage 200 is installed in printer chassis 300 (with bushing 241 slidably mounted on carriage guide 382) is wall 248.

Figure 19:
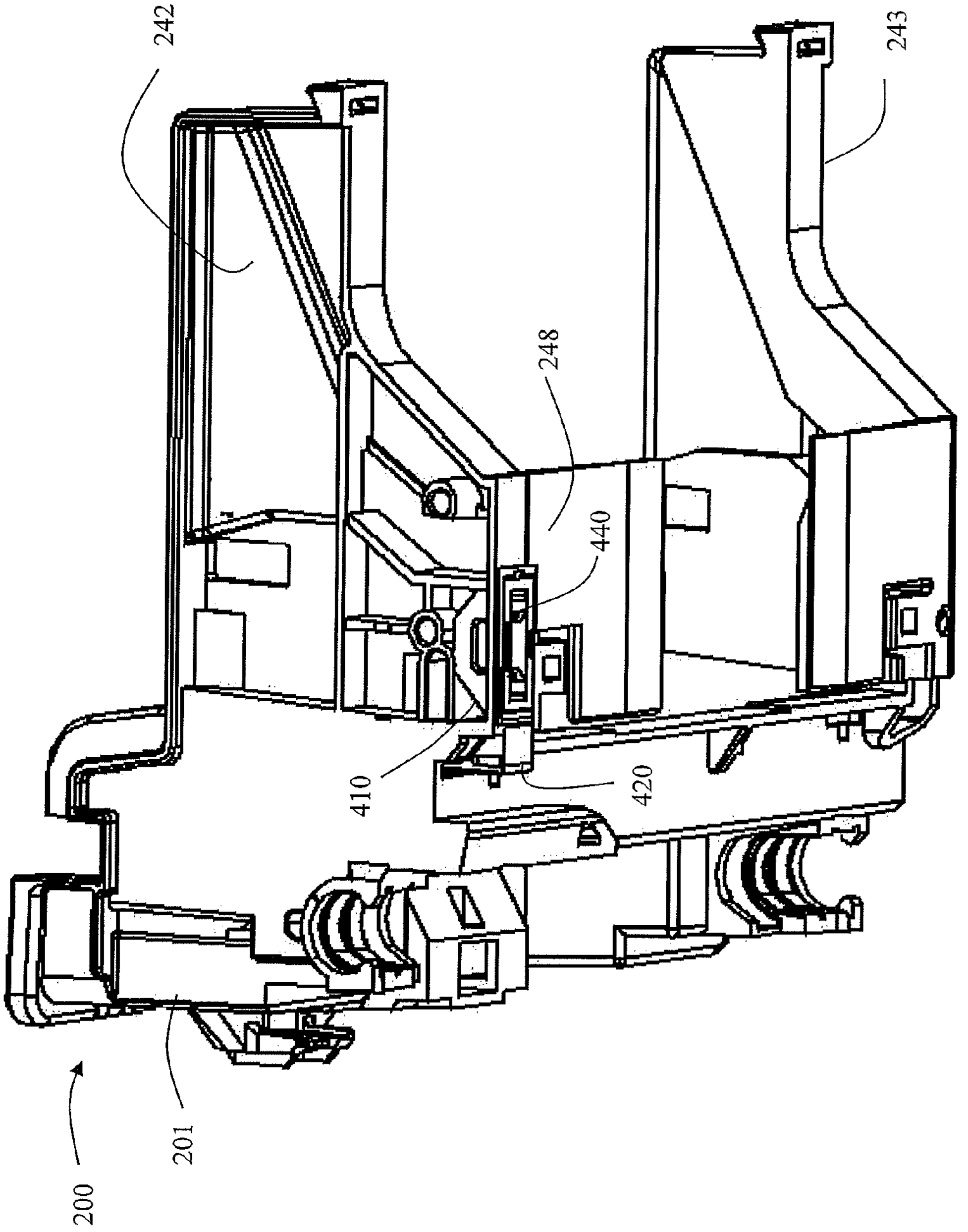
FIG. 19 is a bottom perspective of the carriage of FIG. 18.
Figure 20:
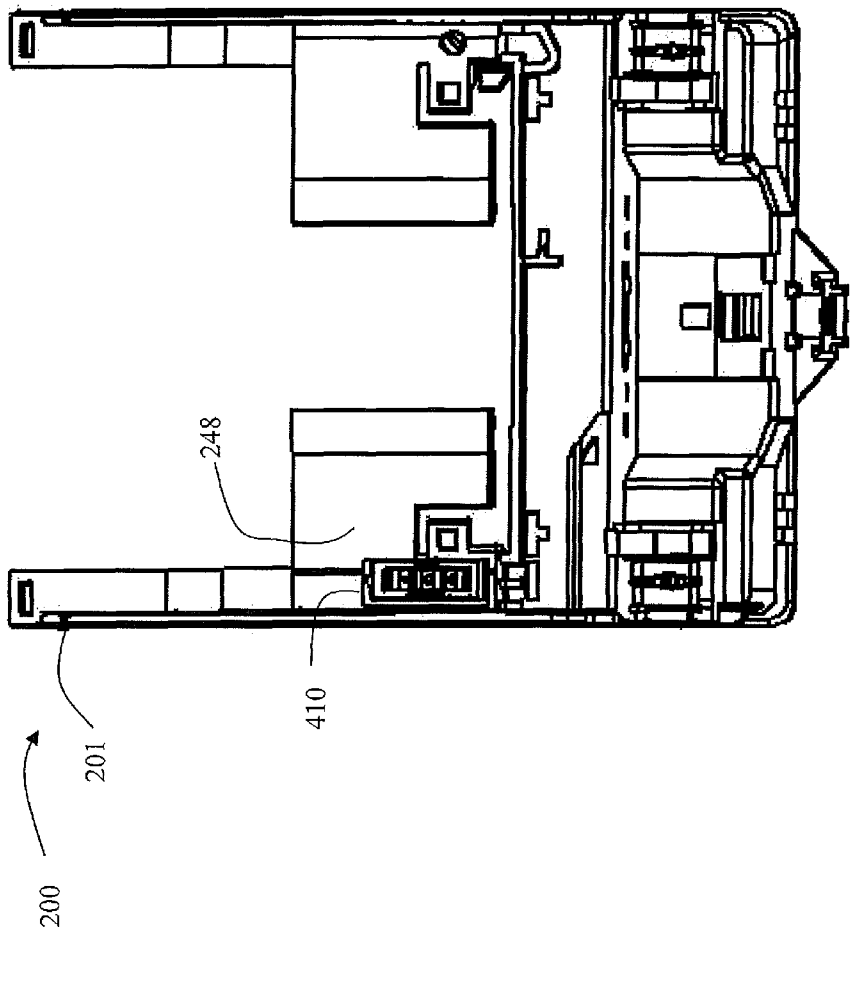
FIG. 20 is a bottom view of the carriage of FIG. 18.
Figure 21:
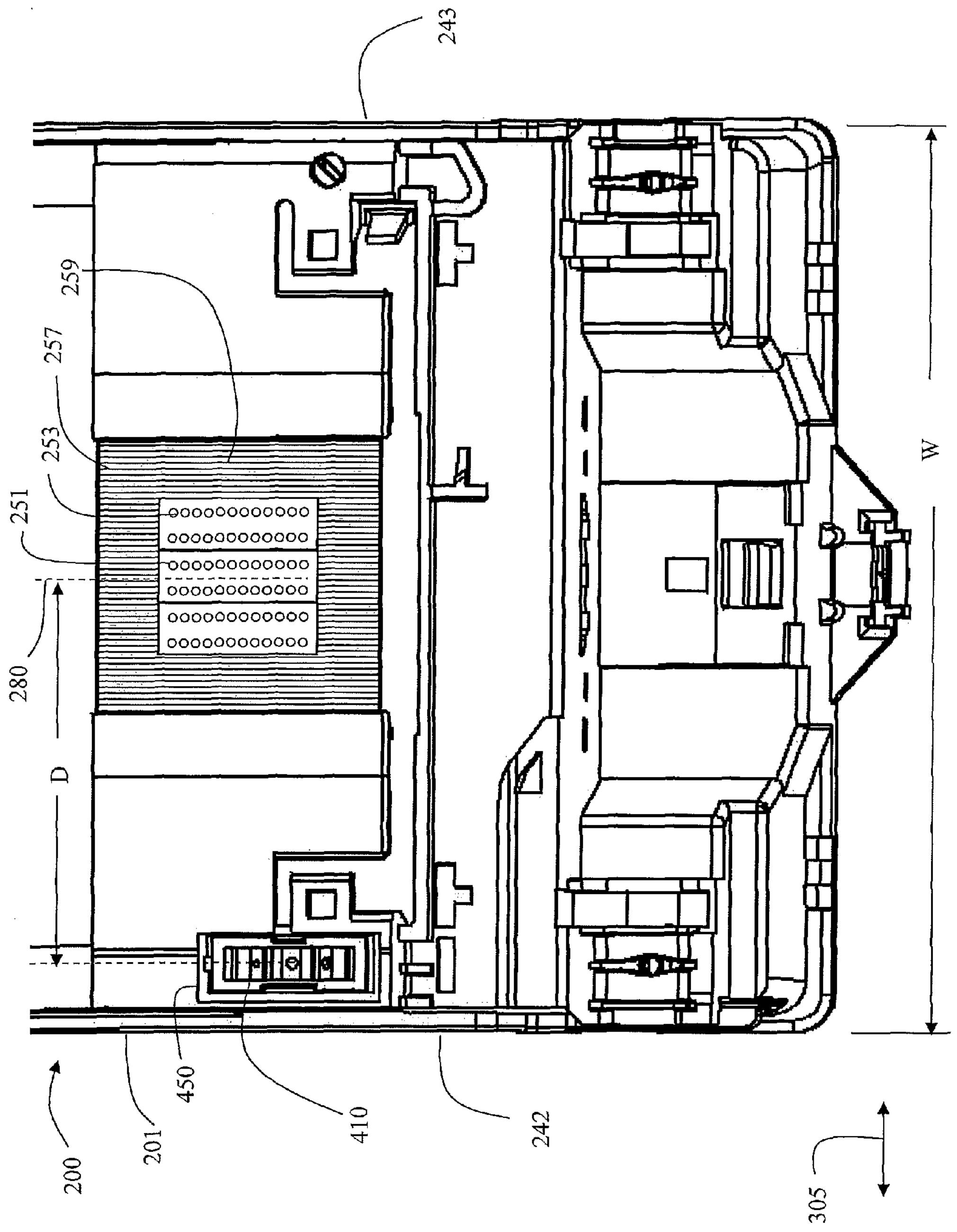
FIG. 21 is an enlarged bottom view of the carriage of FIG. 18 and also including a printhead face.

FIG. 19 shows a bottom perspective and FIG. 20 shows a bottom view of carriage 200 with optical sensor assembly 410 disposed within wall 248 between side walls 242 and 243. Open face 440 of optical sensor assembly 410, like wall 248, faces print region 303 (FIG. 3) when carriage 200 is installed in printer chassis 300. In FIG. 19, flexible circuit 420 is shown in the bent configuration of FIG. 17 for connection to a carriage electronics board (not shown) mounted on a carriage frame 201. FIG. 21 shows an enlarged bottom view of a portion of carriage 200, also showing three printhead die 251 with six nozzle arrays 253 and printhead flexible circuit 257 located on a printing face 259 between outer side wall 242 and outer side wall 243. Nozzle arrays 253 are portions of drop ejector arrays that are examples of marking elements included in printhead 250 (FIG. 2). A dashed line 280 indicates a center of the plurality of arrays of marking elements (i.e. a center of the six nozzle arrays 253). Carriage 200 includes a carriage width W along carriage scan direction 305. Optical sensor assembly 410 is disposed on carriage 200 at a predetermined separation S from the center 280 of the plurality of arrays of marking elements, such that S is less than half the carriage width W. In some embodiments, the outer housing 450 of optical sensor assembly 410 is integrated as part of carriage 200, rather than being a discrete part that is subsequently mounted to carriage 200.

Having described the structural elements of optical assembly 410, carriage 200 and carriage printer chassis 300, embodiments of assembly methods will now be described with reference to FIGS. 3 and 7-21. Embodiments are described relative to optical sensor assemblies 410 including one or two light sources. A flexible circuit subassembly 421 including the photosensor 462 and at least one light source 464 or 466 is provided. The mounting member 430 including the first cavity 431 and at least a second cavity 432 or 434 is provided such that the second cavity 432 or 433 has an orientation that is different than an orientation of the first cavity 431. Mounting member 430 can be formed by injection molding, for example. Flexible circuit subassembly 421 is mounted on mounting member 430 such that the photosensor 462 is disposed in the first cavity 431 and light source 464 or 466 is disposed with second cavity 432 or 433. Mounting member 430 is affixed to an outer housing 450, such that a connector end 422 of flexible circuit subassembly extends outwardly from mounting member 430 and outer housing 450.

In providing flexible circuit subassembly 421, photosensor 462 can be conductively bonded (for example by solder bonding) to the first set of electrical connection pads 426 on the flexible circuit 420. Similarly light source 464 is conductively bonded to the second set of electrical connection pads 427, and optionally an additional light source 466 is conductively bonded to the third set of electrical connection pads 428.

Mounting flexible circuit subassembly 421 on mounting member 430 can include engaging a locating feature (such as hole 425) in flexible circuit 420 with a corresponding locating feature (such as projection 435) of mounting member 430. In particular, projection 435 can be inserted into hole 425 and the flexible circuit subassembly 421 can then be wrapped on mounting member 430, bending flexible region(s) 424 at locations between photosensor 462 and first light source 464, and optionally also between first light source 464 and second light source 466. Photosensor 462 is placed within first cavity 431 and a first light source 432 is placed within the second cavity 432. In some embodiments a second light source 433 is placed within the third cavity 433.

Mounting member 430 is then affixed to outer housing 450 such that a portion of flexible circuit subassembly 421 is pinched between outer housing 450 and mounting member 430 in order to provide strain relief. Affixing the mounting member 430 to outer housing 450 can include snap fitting. During 25, snap fitting, a pair of opposing walls (first housing side wall 457 and second housing side wall 458) are outwardly deformed. In particular, as mounting member 430 is inserted into outer housing 450, a pair of tapered portions 444 and 445 of side walls 437 and 438 is pushed into slidable contact with wedge-shaped second latching features 456 on each of the pair of housing side walls 457 and 458. As mounting member 430 is pushed further into outer housing 450, first and second housing side walls 457 and 458 are deformed outwardly until first latching features 446 move past second latching features 456, permitting first and second housing side walls 457 and 458 to snap back into their original positions and latch mounting member 430 into position.

Assembling carriage printer chassis 300 can include providing the platen 301 to support print media within a print region; providing the carriage guide 382 extending parallel to platen 301, providing the carriage 200 including the carriage frame 201 having a portion (such as wall 248) configured to be proximate the printing face 259 of the printhead 250; affixing the optical sensor assembly 410 to the portion (such as wall 248) configured to be proximate the printing face 259 of the printhead 250; and slidably mounting the carriage frame 201 (at bushing 241) onto carriage guide 382, such that the portion (wall 248) of carriage frame 201 faces platen 301. In some embodiments, outer housing 450 is injection molded as part of carriage frame 201. Connector end 422 of flexible circuit subassembly 421 is connected to a carriage electronics board (not shown) that is affixed to carriage frame 201.

In addition to the advantages of optical sensor assembly 410 described above (including compactness, low cost assembly, and more accurate positioning), a further advantage is improved optical efficiency. Optical sensor assembly 410 can be mounted significantly closer to print region 303 than prior art carriage sensor 210. Since light intensity is inversely proportional to the square of the distance, the closer positioning results in improved optical efficiency, The invention has been described in detail with particular reference to certain preferred embodiments thereof, but it will be understood that variations and modifications can be effected within the spirit and scope of the invention.

PARTS LIST

10 Inkjet printer system
12 Image data source
14 Controller
15 Image processing unit
16 Electrical pulse source
18 First ink source
19 Second ink source
20 Recording medium
100 Inkjet printhead
110 Inkjet printhead die
111 Substrate
120 First nozzle array
121 Nozzle(s)
122 Ink delivery pathway (for first nozzle array)
130 Second nozzle array
131 Nozzle(s)
132 Ink delivery pathway (for second nozzle array)
181 Droplet(s) (ejected from first nozzle array)
182 Droplet(s) (ejected from second nozzle array)
200 Carriage
201 Carriage frame
210 Carriage sensor
211 Frame of carriage sensor assembly
212 Photosensor
213 Bolt
214 Aperture
215 Photosensor lens
216 LED mounted for diffuse reflections
217 LED lens
218 LED mounted for specular reflections
219 LED lens
220 Wiring board
221 Photosensor electrical leads
222 LED electrical leads
223 LED electrical leads

241 Bushing
242 Side wall
243 Side wall
244 Connector
245 Flap
246 Holding receptacle
248 Wall (facing print region)
250 Printhead
251 Printhead die
253 Nozzle array
254 Nozzle array direction
255 Mounting substrate
256 Encapsulant
257 Printhead flexible circuit
258 Connector board
259 Printing face
262 Multichamber ink tank
264 Single chamber ink tank
275 Rear wall
280 Center of arrays of marking elements
300 Printer chassis
301 Platen
302 Paper load entry direction
303 Print region
304 Media advance direction
305 Carriage scan direction
306 Right side of printer chassis
307 Left side of printer chassis
308 Front of printer chassis
309 Rear of printer chassis
310 Hole (for paper advance motor drive gear)
311 Feed roller gear
312 Feed roller
313 Forward rotation direction (of feed roller)
320 Pick-up roller
322 Turn roller
323 Idler roller
324 Discharge roller
325 Star wheel(s)
330 Maintenance station
332 Cap
370 Stack of media
371 Top piece of medium
380 Carriage motor
382 Carriage guide
383 Linear encoder
384 Belt
390 Printer electronics board
392 Cable connectors
410 Optical sensor assembly
420 Flexible circuit
421 Flexible circuit subassembly
422 Connector end
423 Rigid member
424 Flexible region
425 Hole
426 First set of electrical connection pads
427 Second set of electrical connection pads
428 Third set of electrical connection pads
429 Lead
430 Mounting member
431 First cavity
432 Second cavity
433 Third cavity
434 Support feature
435 Projection
436 First pinching portion

437 First side wall
438 Second side wall
439 Second face
440 Open face
441 First aperture
442 Second aperture
443 Third aperture
444 First tapered portion
445 Second tapered portion
446 First latching feature
450 Outer housing
451 Window(s)\
453 Second pinching portion
454 Recess
455 Open portion
456 Second latching feature
457 First housing side wall
458 Second housing side wall
462 Photosensor
464 First light source
466 Second light source

The invention claimed is:

1. A method of assembling an optical sensor assembly for a carriage of a carriage printer, the method comprising:

providing a flexible circuit subassembly including a photosensor and a light source;

providing a mounting member including a first cavity and a second cavity having an orientation that is different than an orientation of the first cavity;

mounting the flexible circuit subassembly on the mounting member such that the photosensor is disposed in the first cavity and the light source is disposed in the second cavity; and affixing the mounting member to an outer housing, wherein a connector end of the flexible circuit subassembly extends outwardly from the mounting member and the outer housing; wherein mounting the flexible circuit subassembly on the mounting member includes bending a flexible region of the flexible circuit assembly at a location between the photosensor and the light source.

2. The method according to claim 1, wherein providing the mounting member includes injection molding the mounting member.

3. The method according to claim 1, wherein mounting the flexible circuit subassembly on the mounting member includes engaging a locating feature of the flexible circuit subassembly with a corresponding locating feature of the mounting member.

4. The method according to claim 3, wherein engaging the locating feature of the flexible circuit subassembly with the corresponding locating feature of the mounting member includes inserting a projection of the mounting member into an alignment hole of the flexible circuit subassembly.

5. The method according to claim 1, wherein affixing the mounting member to the outer housing includes snap fitting the mounting member into the outer housing.

6. The method according to claim 5, wherein snap fitting the mounting member into the outer housing includes outwardly deforming a pair of opposing walls of the outer housing.

7. The method according to claim 6, wherein outwardly deforming a pair of opposing walls of the outer housing includes inserting the mounting member into the outer housing such that a pair of tapered portions of side walls of the mounting member is pushed into slidable contact with wedge shaped features on each of the pair of opposing side walls of the outer housing.

8. A method of assembling an optical sensor assembly for a carriage of a carriage printer, the method comprising:

providing a flexible circuit subassembly including a photosensor and a light source;

providing a mounting member including a first cavity and a second cavity having an orientation that is different than an orientation of the first cavity;

mounting the flexible circuit subassembly on the mounting member such that the photosensor is disposed in the first cavity and the light source is disposed in the second cavity; and affixing the mounting member to an outer housing, wherein a connector end of the flexible circuit subassembly extends outwardly from the mounting member and the outer housing; wherein providing the flexible circuit subassembly includes:

providing a flexible circuit including a first set of electrical connection pads and a second set of electrical connection pads;

conductively bonding the photosensor to the first set of electrical connection pads; and conductively bonding the light source to the second set of electrical connection pads.

9. A method of assembling an optical sensor assembly for a carriage of a carriage printer, the method comprising:

providing a flexible circuit subassembly including a photosensor and a light source;

providing a mounting member including a first cavity and a second cavity having an orientation that is different than an orientation of the first cavity;

mounting the flexible circuit subassembly on the mounting member such that the photosensor is disposed in the first cavity and the light source is disposed in the second cavity; and affixing the mounting member to an outer housing, wherein a connector end of the flexible circuit subassembly extends outwardly from the mounting member and the outer housing; wherein affixing the mounting member to the outer housing includes pinching a portion of the flexible circuit subassembly between the outer housing and the mounting member.

* * * * *